(12) United States Patent
Xue et al.

(10) Patent No.: US 12,348,379 B2
(45) Date of Patent: Jul. 1, 2025

(54) FAULT DETECTION METHOD, APPARATUS, AND SYSTEM

(71) Applicant: Huawei Technologies Co., Ltd., Shenzhen (CN)

(72) Inventors: Li Xue, Nanjing (CN); Liang Zhang, Nanjing (CN); Jian Cheng, Nanjing (CN); Yanfang Zhang, Nanjing (CN); Xiaoyun Si, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/871,662

(22) Filed: Jul. 22, 2022

(65) Prior Publication Data

US 2022/0368590 A1 Nov. 17, 2022

Related U.S. Application Data

(63) Continuation of application No. PCT/CN2020/119034, filed on Sep. 29, 2020.

(30) Foreign Application Priority Data

Jan. 24, 2020 (CN) .......................... 202010077204.0

(51) Int. Cl.
*H04W 56/00* (2009.01)
*H04L 41/0677* (2022.01)
(Continued)

(52) U.S. Cl.
CPC ........ *H04L 41/142* (2013.01); *H04L 41/0677* (2013.01); *H04L 41/5009* (2013.01);
(Continued)

(58) Field of Classification Search
CPC .. H04L 41/0677; H04L 41/5009; H04L 69/16
(Continued)

(56) References Cited

U.S. PATENT DOCUMENTS

| | | | |
|---|---|---|---|
| 11,463,918 B2 | 10/2022 | Xin et al. | |
| 2010/0005469 A1* | 1/2010 | Bose | G06Q 10/0637 |
| | | | 718/102 |

(Continued)

FOREIGN PATENT DOCUMENTS

| | | |
|---|---|---|
| CN | 103973496 A | 8/2014 |
| CN | 106302001 A | 1/2017 |

(Continued)

OTHER PUBLICATIONS

"Pan et al., A Network Failure Detecting Method Based On Wireless Self-study, Aug. 16, 2019, CN 20191034303" (Year: 2019).*

(Continued)

*Primary Examiner* — Sai Ming Chan
(74) *Attorney, Agent, or Firm* — Slater Matsil, LLP

(57) ABSTRACT

In certain embodiments, a forwarding device receives at least one service flow. The forwarding device obtains service information of the at least one service flow, where the service information of the service flow includes identification information of a network object to which the service flow belongs and M key performance indicators KPIs of the service flow. M is an integer greater than 0, and the network object includes one or more devices. The forwarding device sends detection information to a first device, where the detection information includes the service information of the at least one service flow or a feature set obtained based on the service information of the at least one service flow. The detection information is used to detect whether the network object is in a faulty state.

20 Claims, 10 Drawing Sheets

(51) Int. Cl.
*H04L 41/142* (2022.01)
*H04L 41/5009* (2022.01)
*H04L 69/16* (2022.01)
*H04L 41/0894* (2022.01)
*H04L 41/0895* (2022.01)
*H04L 43/08* (2022.01)

(52) U.S. Cl.
CPC .......... *H04L 69/16* (2013.01); *H04L 41/0894* (2022.05); *H04L 41/0895* (2022.05); *H04L 43/08* (2013.01)

(58) Field of Classification Search
USPC ........................................................ 370/242
See application file for complete search history.

(56) References Cited

U.S. PATENT DOCUMENTS

| | | | |
|---|---|---|---|
| 2017/0180190 A1 | 6/2017 | Kubinszky et al. | |
| 2017/0279837 A1 | 9/2017 | Dasgupta et al. | |
| 2018/0077031 A1* | 3/2018 | Chen | H04L 41/5041 |
| 2018/0270126 A1 | 9/2018 | Tapia | |
| 2018/0270148 A1* | 9/2018 | Ni | H04L 45/64 |
| 2019/0042298 A1* | 2/2019 | Sunku | G06F 9/5027 |
| 2019/0296968 A1 | 9/2019 | Xue et al. | |
| 2021/0027173 A1 | 1/2021 | Song et al. | |
| 2022/0368606 A1 | 11/2022 | Xue et al. | |

FOREIGN PATENT DOCUMENTS

| | | |
|---|---|---|
| CN | 106789177 A | 5/2017 |
| CN | 107426003 A | 12/2017 |
| CN | 109561300 A | 4/2019 |
| CN | 110071843 A | 7/2019 |
| CN | 110365503 A | 10/2019 |
| CN | 110502398 A | 11/2019 |
| CN | 110519802 A | 11/2019 |
| EP | 3197198 A1 | 7/2017 |
| WO | 2016119822 A1 | 8/2016 |
| WO | 2017216097 A1 | 12/2017 |
| WO | 2021147370 A1 | 7/2021 |

OTHER PUBLICATIONS

"Gupta et al., Method And System For Selecting And Monitoring A Plurality Of Service Performance Index, Dec. 7, 2016, CN 20160353879" (Year: 2016).*

* cited by examiner

FAULT DETECTION METHOD, APPARATUS, AND SYSTEM

CROSS-REFERENCE TO RELATED APPLICATIONS

This application is a continuation of International Application No. PCT/CN2020/119034, filed on Sep. 29, 2020, which claims priority to Chinese Patent Application No. 20201007204.0, filed on Jan. 24, 2020. The disclosures of the aforementioned applications are hereby incorporated by reference in their entireties.

TECHNICAL FIELD

This application relates to the communication field, and in particular, to a fault detection method, apparatus, and system.

BACKGROUND

A data communications network or a data center network includes a large quantity of network objects such as terminals or servers. The network object is connected to an access device, and the access device is connected to a wide area network through a forwarding device. In this way, the network object may transmit a service flow through the access device, the forwarding device, and the wide area network.

When a fault occurs in the network object, a service may be interrupted, and a serious loss is caused. Therefore, the network object needs to be detected, the fault that occurs in the network object may be found in time based on a detection result, and then a corresponding measure is taken to process the network object. To detect the network object, an analysis platform may be deployed currently, and the analysis platform includes a network object detection model. When a network management system finds that a network object is abnormal, the network management system may configure an access device or a forwarding device to mirror a service flow of the network object when the access device or the forwarding device receives the service flow of the network object. The access device or the forwarding device sends the service flow obtained through mirroring to the analysis platform. The analysis platform detects the network object based on the service flow by using the fault detection model, to detect whether the network object is really faulty.

In a process of implementing this application, the inventor finds that the conventional technology has at least the following problems.

The access device or the forwarding device mirrors the service flow of the network object, and then sends the service flow obtained through mirroring to the analysis platform, so that the analysis platform detects the network object again. This consumes a large quantity of network resources. In addition, currently, when the network management system discovers an exception, the network management system configures the access device or the forwarding device to mirror the service flow of the network object, resulting in long time required for fault detection and a great delay.

SUMMARY

This application provides a fault detection method, apparatus, and system, to reduce consumption of network resources and improve fault detection efficiency. Technical solutions are as follows.

According to a first aspect, this application provides a fault detection method. The method includes: A forwarding device receives at least one service flow. The forwarding device obtains service information of the at least one service flow, where each piece of service information of a service flow includes identification information of a network object to which the service flow belongs and M key performance indicators (KPIs) of the service flow, M is an integer greater than 0, and the network object includes one or more devices. The forwarding device sends detection information to a first device, where the detection information includes the service information of the at least one service flow or a feature set obtained based on the service information of the at least one service flow, and the detection information is used to detect whether the network object is in a faulty state. Because the detection information obtained by the forwarding device includes the service information of the at least one service flow or the feature set obtained based on the service information of the at least one service flow, a data volume of the detection information is less than a data volume of the service flow, and network resources consumed for sending the detection information by the forwarding device is less than network resources consumed for sending the service flow by the forwarding device. In this way, consumption of network resources is reduced. Because the data volume of the detection information is small, when receiving the service flow, the forwarding device may obtain the detection information, and send the detection information to the first device, so that the first device can perform real-time detection, to detect the network object in the faulty state in a timely manner, so as to improve detection efficiency.

In a possible implementation, a protocol type of the service flow is Transmission Control Protocol (TCP). The forwarding device obtains at least one target service packet from the service flow based on configuration policy information, where the configuration policy information includes at least one preset packet type. The forwarding device obtains the M KPIs of the service flow based on the at least one target service packet. Because the target service packet is obtained from the service flow, and the M KPIs of the service flow are obtained based on the target service packet, a quantity of packets that need to be analyzed can be reduced, and KPI obtaining efficiency can be improved.

In another possible implementation, the M KPIs include a network delay between the forwarding device and the network object, and/or a data volume that is of the service flow and sent by the network object and a data volume that is of the service flow and received by the network object. When the at least one target service packet includes a first target service packet and a second target service packet, the forwarding device obtains the network delay between the forwarding device and the network object based on first time at which the first target service packet is received and second time at which the second target service packet is received. The first target service packet is a packet sent to the network object, and the second target service packet is a packet that is sent by the network object and that corresponds to the first target service packet. In addition/Alternatively, when the at least one target service packet includes a first start packet and a first end packet, the forwarding device obtains, based on a sequence number of the first start packet and a sequence number of the first end packet, a data volume that is of the service flow and sent by the network object. The first start packet is the $1^{st}$ packet that is of the service flow and sent by the network object, and the first end packet is the last packet that is of the service flow and sent by the network object. In addition/Alternatively, when the at least one target service packet includes a second start packet and a second end packet, the forwarding device obtains, based on a sequence number of the second start packet and a sequence number of the second end packet, a data volume that is of the service flow and received by the network object. The second start packet is the $1^{st}$ packet that is of the service flow and received by the network object, and the second end packet is the last packet that is of the service flow and received by the network object. In this way, the network delay, and the data volume sent or received by the network object can be accurately obtained.

In another possible implementation, the M KPIs include a status identifier, and the status identifier identifies a status of the service flow. When the at least one target service packet includes the first start packet, in a first time length after third time, if the forwarding device receives the first end packet, the forwarding device sets the status identified by the status identifier to a success state; or if the forwarding device does not receive the first end packet, the forwarding device sets the status identified by the state identifier to a failure state. The third time is time at which the first start packet is received, the first start packet is the $1^{st}$ packet that is of the service flow and sent by the network object, and the first end packet is the last packet that is of the service flow and sent by the network object. In this way, the state identifier of the service flow can be accurately obtained, to improve accuracy of obtaining the state identifier.

In another possible implementation, the forwarding device obtains, from the at least one service flow, KPIs of N service flows that are in a current cycle and that belong to a target network object. The target network object is a network object to which any one of the at least one service flow belongs, and N is an integer greater than 0. The forwarding device obtains a feature set based on the KPIs of the N service flows. Because the feature set includes a feature obtained based on a KPI of each service flow that belongs to the target network object, the feature set can better reflect a health status of the network object. Fault detection is performed based on the feature set by using a trained fault detection model, so that a detection result is more accurate.

In another possible implementation, the feature set includes at least one statistical feature. The forwarding device obtains M KPI sets. Any KPI set includes one KPI of each of the N service flows, and types of the KPIs included in the any KPI set are the same. The forwarding device performs calculation on the KPIs included in the any KPI set in at least one first calculation manner, to obtain at least one statistical feature corresponding to the any KPI set. The at least one first calculation manner includes one or more of the following: collecting statistics about the KPIs in the any KPI set, and calculating an average value, a variance, dispersion, skewness, or kurtosis of the KPIs included in the any KPI set. Because different statistical features obtained through statistics collection form a feature set, features included in the feature set are enriched, and the feature set can better reflect the health status of the network object.

In another possible implementation, the feature set further includes at least one time domain feature. The forwarding device performs calculation on statistical features included in the statistical feature set in at least one second calculation manner, to obtain at least one time domain feature. The statistical feature set includes K statistical features, the K statistical features are statistical features that are of a same type and obtained through calculation in K cycles, and the K cycles include the current cycle and K−1 cycles before the current cycle. The at least one second calculation manner includes one or more of the following: calculating a period-on-period value or a differential value between two adjacent statistical features in the statistical feature set, and performing feature fitting on the statistical features in the statistical feature set. Because the time domain feature is obtained based on the statistical features in the K cycles, and the feature set further includes the time domain feature, the feature set includes a time sequence feature.

In another possible implementation, the any KPI set includes status identifiers of the N service flows, and the status identifier of any one of the N service flows identifies a status of the any service flow. The statistical feature of the any KPI set includes a quantity of status identifiers that identify the success state and a quantity of status identifiers that identify the failure state. The feature set further includes a proportion of service flows in the success state and/or a proportion of service flows in the failure state. The proportion of the service flows in the success state is calculated based on the quantity of status identifiers that identify the success state and a quantity of KPIs included in the any KPI set, and/or the proportion of the service flows in the failure state is calculated based on the quantity of status identifiers that identify the failure state and the quantity of KPIs included in the any KPI set. Because the feature set further includes the status identifier, the features in the feature set are more enriched.

In another possible implementation, the first device is a cloud platform, an analyzer platform, or an upstream device of the forwarding device.

In another possible implementation, the network object is a terminal, a server, a client, a virtual machine, a router, a switch, a device in a virtual local area network (VLAN), or a device in a specified network segment.

According to a second aspect, this application provides a fault detection method. The method includes: A first device receives service information that is of at least one service flow and sent by a forwarding device. The service information of the service flow includes identification information of a network object to which the service flow belongs and M KPIs of the service flow, M is an integer greater than 0, and the network object includes one or more devices. The first device detects, based on the service information of the at least one service flow by using a fault detection model, whether the network object is in a faulty state; or obtains, based on the service information of the at least one service flow, at least one feature set used to detect the network object. Because the service information sent by the forwarding device includes the identification information of the network object and the KPIs, a data volume of the service information is far less than a data volume of the service flow. In this way, network resources consumed when the first device receives the service information are reduced. Because the data volume of the service information is small, when receiving the service flow, the forwarding device may obtain the service information, and send the service information to the first device, so that the first device can perform real-time detection, to detect the network object in the faulty state in a timely manner, so as to improve detection efficiency.

In a possible implementation, the first device obtains, from the at least one service flow, KPIs of N service flows that are in a current cycle and that belong to a target network object. The target network object is a network object to which any one of the at least one service flow belongs, and N is an integer greater than 0. The first device obtains a feature set based on the KPIs of the N service flows. The first device detects, based on the feature set by using the fault detection model, whether the target network object is in the faulty state. Because the feature set includes a feature obtained based on a KPI of each service flow that belongs to the target network object, the feature set can better reflect a health status of the network object. The network object is detected based on the feature set, and this improves detection accuracy.

In another possible implementation, the feature set includes at least one statistical feature. The first device obtains M KPI sets. Any KPI set includes one KPI of each of the N service flows, and types of the KPIs included in the any KPI set are the same. The first device performs calculation on the KPIs included in the any KPI set in at least one first calculation manner, to obtain at least one statistical feature corresponding to the any KPI set. The at least one first calculation manner includes one or more of the following: collecting statistics about the KPIs in the any KPI set, and calculating an average value, a variance, dispersion, skewness, or kurtosis of the KPIs included in the any KPI set. Because different statistical features obtained through statistics collection form a feature set, features included in the feature set are enriched, and the feature set can better reflect the health status of the network object, so that detection accuracy is further improved.

In another possible implementation, the feature set further includes at least one time domain feature. Calculation is performed on the statistical features included in the statistical feature set in at least one second calculation manner, to obtain the at least one time domain feature. The statistical feature set includes K statistical features, the K statistical features are statistical features that are of a same type and obtained through calculation in K cycles, and the K cycles include the current cycle and K−1 cycles before the current cycle. The at least one second calculation manner includes one or more of the following: calculating a period-on-period value or a differential value between two adjacent statistical features in the statistical feature set, and performing feature fitting on the statistical features in the statistical feature set. Because the time domain feature is obtained based on the statistical features in the K cycles, and the feature set further includes the time domain feature, the feature set includes a time sequence feature, so that detection accuracy can be improved.

In another possible implementation, the any KPI set includes status identifiers of the N service flows, and the status identifier of any one of the N service flows identifies a status of the any service flow. The statistical feature of the any KPI set includes a quantity of status identifiers that identify a success state and a quantity of status identifiers that identify a failure state. The feature set further includes a proportion of service flows in the success state and/or a proportion of service flows in the failure state. The proportion of the service flows in the success state is calculated based on the quantity of status identifiers that identify the success state and a quantity of KPIs included in the any KPI set, and/or the proportion of the service flows in the failure state is calculated based on the quantity of status identifiers that identify the failure state and the quantity of KPIs included in the any KPI set. Because the feature set further includes the status identifier, the features in the feature set are more enriched.

In another possible implementation, the M KPIs of the service flow include at least one of a network delay between the network object and the forwarding device, a data volume that is of the service flow and sent by the network object, a data volume that is of the service flow and received by the network object, or a status identifier of the service flow. The status identifier identifies a status of the service flow.

In another possible implementation, when detecting that the target network object is in the faulty state, the first device obtains at least one KPI of the target network object and/or a service flow of the target network object, and performs fault locating based on the at least one KPI of the target network object and/or the service flow of the target network object. The service flow is obtained only when it is detected that the target network object is in the faulty state. In this way, on-demand collection is implemented, and collection of service flows of all network objects is avoided, to save bandwidth resources, and save computing resources required for parsing unnecessary data when the first device performs fault locating.

In another possible implementation, the first device is a cloud platform, an analyzer platform, or an upstream device of the forwarding device.

In another possible implementation, the network object is a terminal, a server, a client, a virtual machine, a router, a switch, a device in a VLAN, or a device in a network segment.

According to a third aspect, this application provides a fault detection apparatus, configured to perform the method in any one of the first aspect or the possible implementations of the first aspect. Specifically, the apparatus includes a unit configured to perform the method according to any one of the first aspect or the possible implementations of the first aspect.

According to a fourth aspect, this application provides a fault detection apparatus, configured to perform the method in any one of the second aspect or the possible implementations of the second aspect. Specifically, the apparatus includes units configured to perform the method according to the second aspect or any possible implementation of the second aspect.

According to a fifth aspect, this application provides a fault detection apparatus, where the apparatus includes a processor, a memory, and a transceiver. The processor, the memory, and the transceiver may be connected through a bus system. The memory is configured to store one or more programs, and the processor is configured to execute the one or more programs in the memory, so that the apparatus completes the method in any one of the first aspect or the possible implementations of the first aspect.

According to a sixth aspect, this application provides a fault detection apparatus, where the apparatus includes a processor, a memory, and a transceiver. The processor, the memory, and the transceiver may be connected through a bus system. The memory is configured to store one or more programs, and the processor is configured to execute the one or more programs in the memory, so that the apparatus completes the method in any one of the second aspect or the possible implementations of the second aspect.

According to a seventh aspect, this application provides a computer-readable storage medium. The computer-readable storage medium stores program code. When the program code is run on a computer, the computer is enabled to perform the method in any one of the first aspect, the second aspect, the possible implementations of the first aspect, or the possible implementations of the second aspect.

According to an eighth aspect, this application provides a computer program product including program code. When the computer program product runs on a computer, the computer is enabled to perform the method in any one of the first aspect, the second aspect, the possible implementations of the first aspect, or the possible implementations of the second aspect.

According to a ninth aspect, this application provides a fault detection system, where the system includes the apparatus according to the third aspect and the apparatus according to the fourth aspect, or the system includes the apparatus according to the fifth aspect and the apparatus according to the sixth aspect.

DETAILED DESCRIPTION OF ILLUSTRATIVE EMBODIMENTS

The following further describes embodiments of this application in detail with reference to the accompanying drawings.

Figure 1:
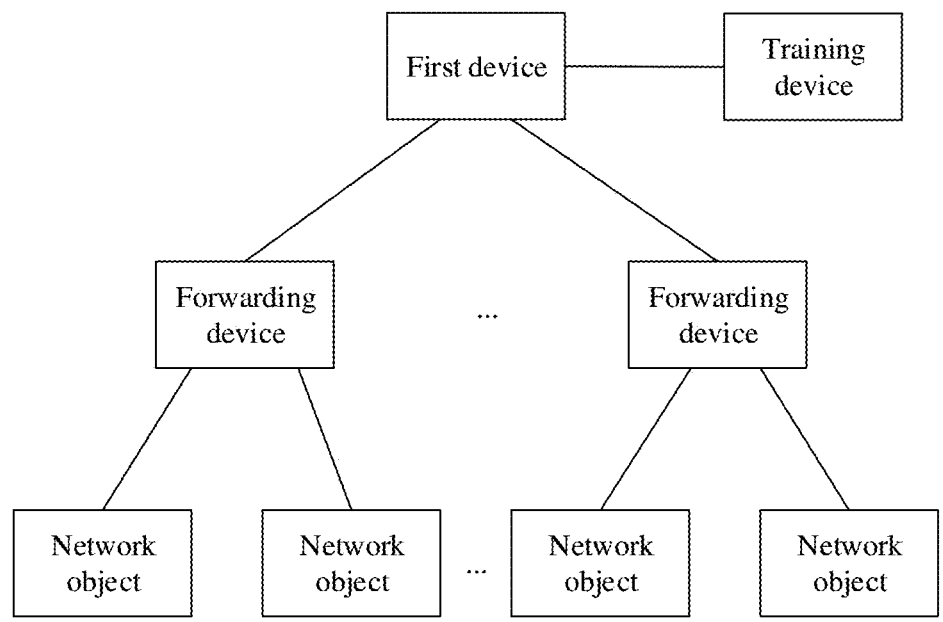
FIG. 1 is a schematic diagram of a network architecture according to an embodiment of this application.

Refer to FIG. 1. An embodiment of this application provides a network architecture. The network architecture includes: a network object, a forwarding device, and a first device, where a network connection is established between the forwarding device and the network object, and a network connection is established between the forwarding device and the first device.

A service path for transmitting a service flow belonging to the network object passes through the forwarding device. To be specific, the network connection between the network object and the forwarding device is a part of the service path. Any service packet included in the service flow belonging to the network object may be sent by the network object. After the network object sends the any service packet, the any service packet is received by the forwarding device, and then the forwarding device forwards the any service packet to an upstream device of the forwarding device. Alternatively, the any service packet may need to be sent to the network object, and the forwarding device first receives the any service packet, and then forwards the any service packet to the network object.

Optionally, the network architecture may further include a training device, and a network connection may be established between the first device and the training device.

Optionally, the network object may be a terminal, a server, a router, a switch, a client, a virtual machine, a device in a VLAN, a device in a specified network segment, or the like. The network segment is an address range, and includes addresses of a plurality of devices.

Optionally, when the network object is a terminal, a server, a router, a switch, a client, a virtual machine, or the like, identification information of the network object is an address of the network object. When the network object is a VLAN or a network segment, the identification information of the network object is identification information of the VLAN or identification information of the network segment.

Optionally, the first device is an upstream device of the forwarding device, or the first device is a cloud platform or an analyzer platform. When the first device is an upstream device of the forwarding device, the service path for transmitting the service flow may pass through the first device. In other words, the network connection between the forwarding device and the first device is also a part of the service path, and the first device may be configured to forward the packet included in the service flow of the network object.

Optionally, the network architecture further includes a network management device. The network management device may establish a network connection to each network object in the network architecture, and establish a network connection to the first device in the network architecture.

Optionally, the foregoing network architecture may be applied to a data communications network. Refer to the data communications network shown in FIG. 2. The data communications network includes at least one terminal, at least one optical network terminal (ONT), at least one optical line terminal (OLT), a broadband remote access server (BRAS), and a core router (CR). Any terminal is connected to one ONT. Any ONT is connected to one OLT. Each of the at least one OLT is further connected to the BRAS, the BRAS is further connected to the CR, and the CR may be connected to a wide area network.

Optionally, a cloud platform or an analyzer platform may be further disposed in the data communications network. A network connection is established between the cloud platform or the analyzer platform and each ONT in the data communications network, and/or a network connection is established between the cloud platform or the analyzer platform and each OLT in the data communications network, and/or a network connection is established between the cloud platform or the analyzer platform and the BRAS in the data communications network.

In the data communications network, the forwarding device may be an ONT, an OLT, a BRAS, or the like. The network object may be a terminal. The first device may be an upstream device of the forwarding device. For example, the forwarding device is an ONT or an OLT, and the first device may be a BRAS. Alternatively, the first device may be the cloud platform or the analyzer platform that has established the network connection to the forwarding device.

Optionally, the foregoing network architecture may be applied to a data center network. Refer to the data center network shown in FIG. 3. The data center network includes at least one server, at least one leaf switch (Leaf), at least one spine switch (Spine), and a gateway (GW). Any server is connected to one leaf. Any leaf is connected to at least one spine. Each spine in the at least one spine is further connected to the GW, and the GW may be further connected to the wide area network.

Optionally, a cloud platform may be further disposed in the data center network. A network connection is established between the cloud platform and each leaf in the data center network, and/or a network connection is established between the cloud platform and each spine. Alternatively, an analyzer platform may be further disposed in the data center network. A network connection is established between the analyzer platform and each leaf in the data center network, and/or a network connection is established between the analyzer platform and each spine.

In the data center network, the forwarding device may be a leaf, a spine, a GW, or the like. The network object may be a server. The first device may be an upstream device of the forwarding device. For example, the forwarding device is a leaf, and the first device may be a spine. Alternatively, the first device may be a cloud platform or an analyzer platform that is connected to each forwarding device through a network.

The network object included in the network architecture provided in this embodiment of this application may be faulty. When a fault occurs in the network object, a service may be interrupted, causing a serious loss. Therefore, the faulty network object needs to be detected in time. The first device may obtain a fault detection model through training, or obtain a fault detection model through training by using a training device. The fault detection model is used to detect whether the network object is in a faulty state. In this way, the first device can detect, in time by using the fault detection model, the network object in which the fault occurs.

To obtain the fault detection model through training, the network management device may configure some network objects in the network architecture to be in the faulty state in a first time period. When receiving a service flow of the network object, the forwarding device in the network architecture obtains service information of the service flow. The service information includes identification information of the network object and M key performance indicators (KPIs), and M is an integer greater than 0. The forwarding device sends training information to the first device, where the training information includes the service information of the service flow or a feature set obtained based on the service information. The first device receives the training information sent by the forwarding device included in the network architecture, and trains an intelligent model based on the received training information, to obtain the fault detection model. The fault detection model may be used to detect whether the network object in the network architecture is in the faulty state.

Figure 4:
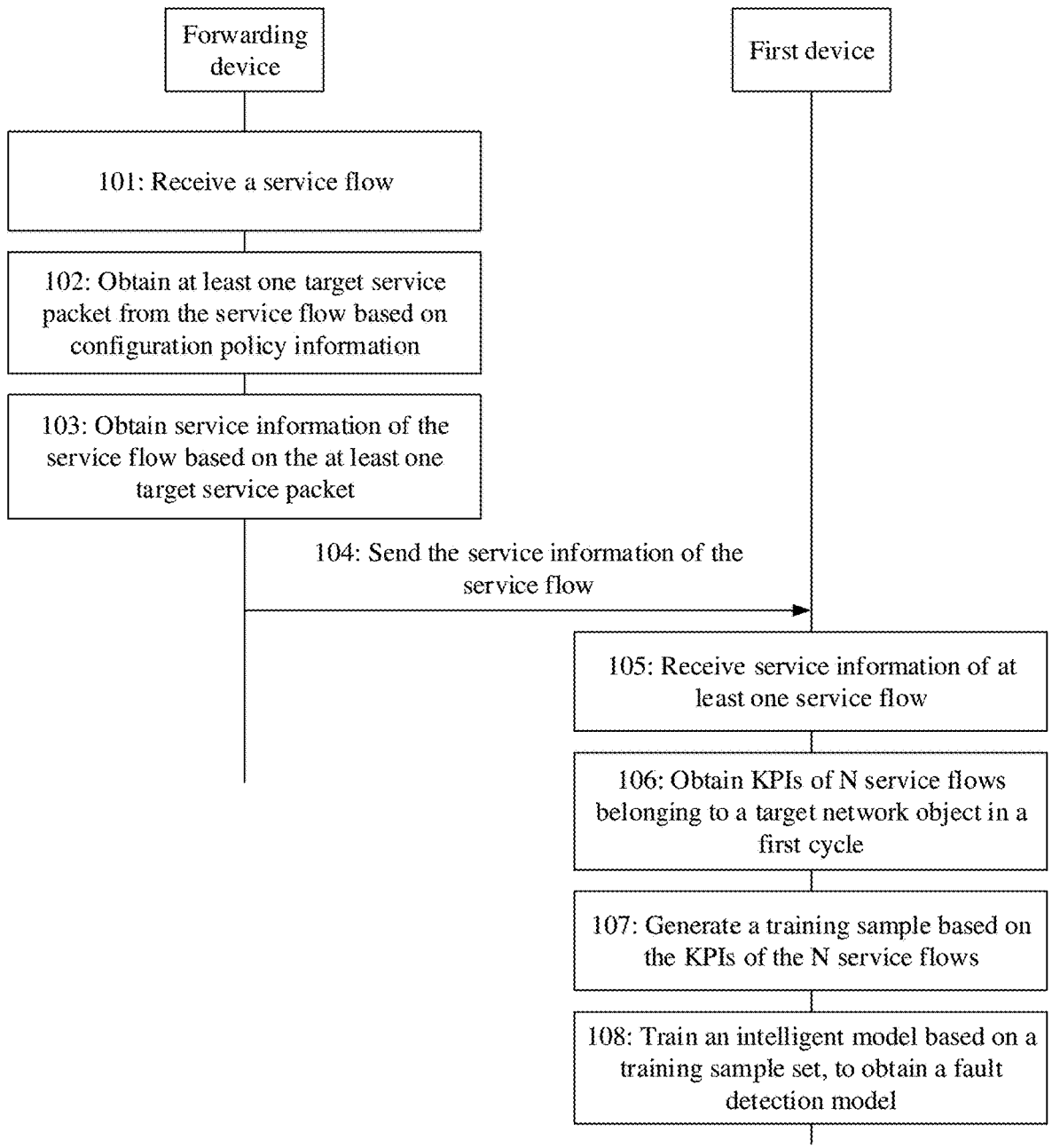
FIG. 4 is a flowchart of a fault detection model training method according to an embodiment of this application.
Figure 7:
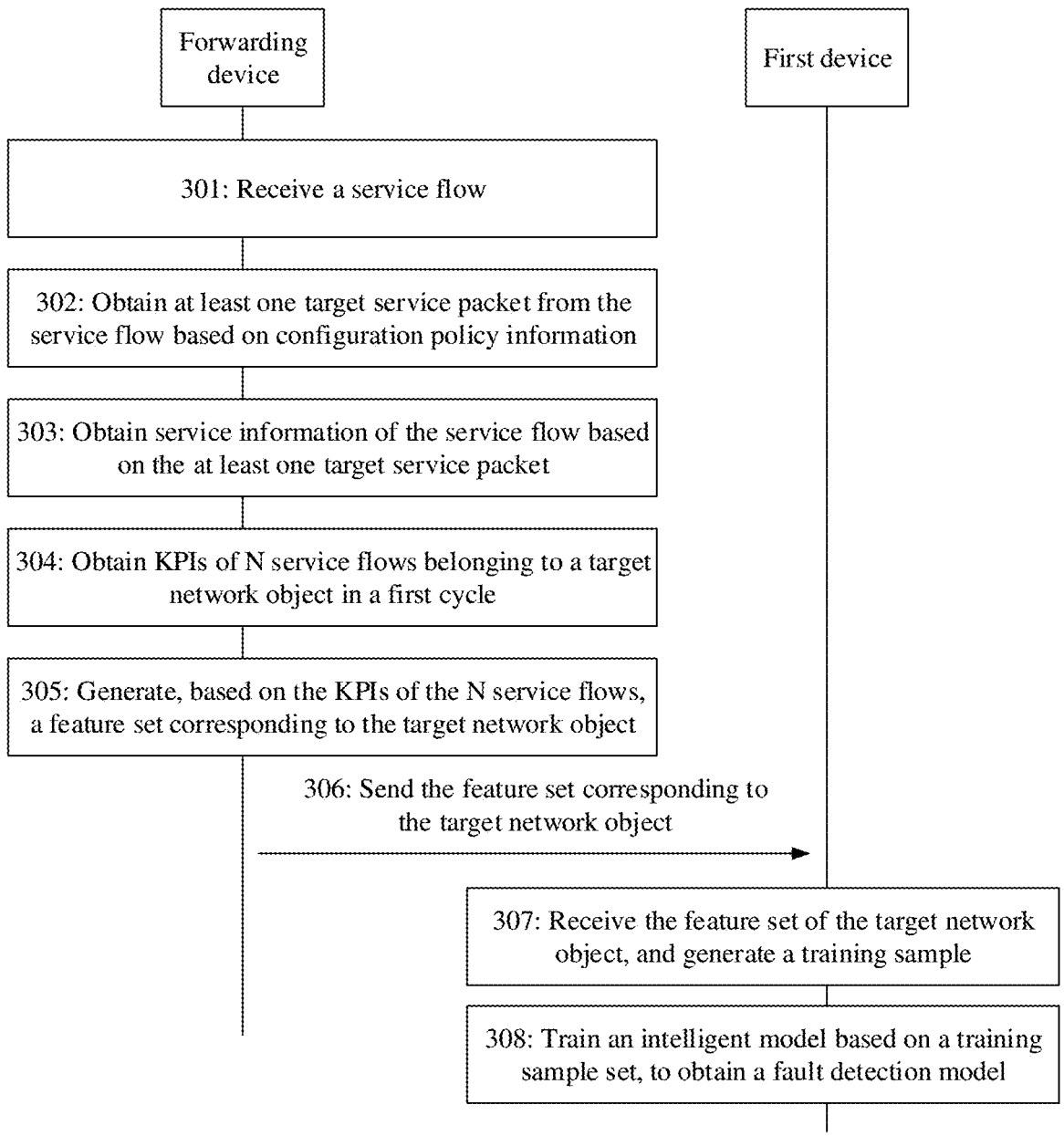
FIG. 7 is a flowchart of another fault detection model training method according to an embodiment of this application.

A detailed obtaining process in which the forwarding device obtains the detection information and a detailed training process in which the first device trains the fault detection model are described in detail in a subsequent embodiment shown in FIG. 4 or FIG. 7, and are not described herein.

Optionally, the faulty state may be a delay faulty state, a link setup faulty state, or the like.

After the first device obtains the fault detection model through training, when receiving a service flow of the network object, the forwarding device obtains the service information of the service flow, and sends detection information to the first device. The detection information includes the service information of the service flow or a feature set obtained based on the service information. The first device receives the detection information sent by the forwarding device included in the network architecture, and detects the network object in the faulty state in the network architecture based on the received detection information by using the fault detection model.

Figure 6:
FIG. 6 is a flowchart of a fault detection method according to an embodiment of this application.
Figure 8:
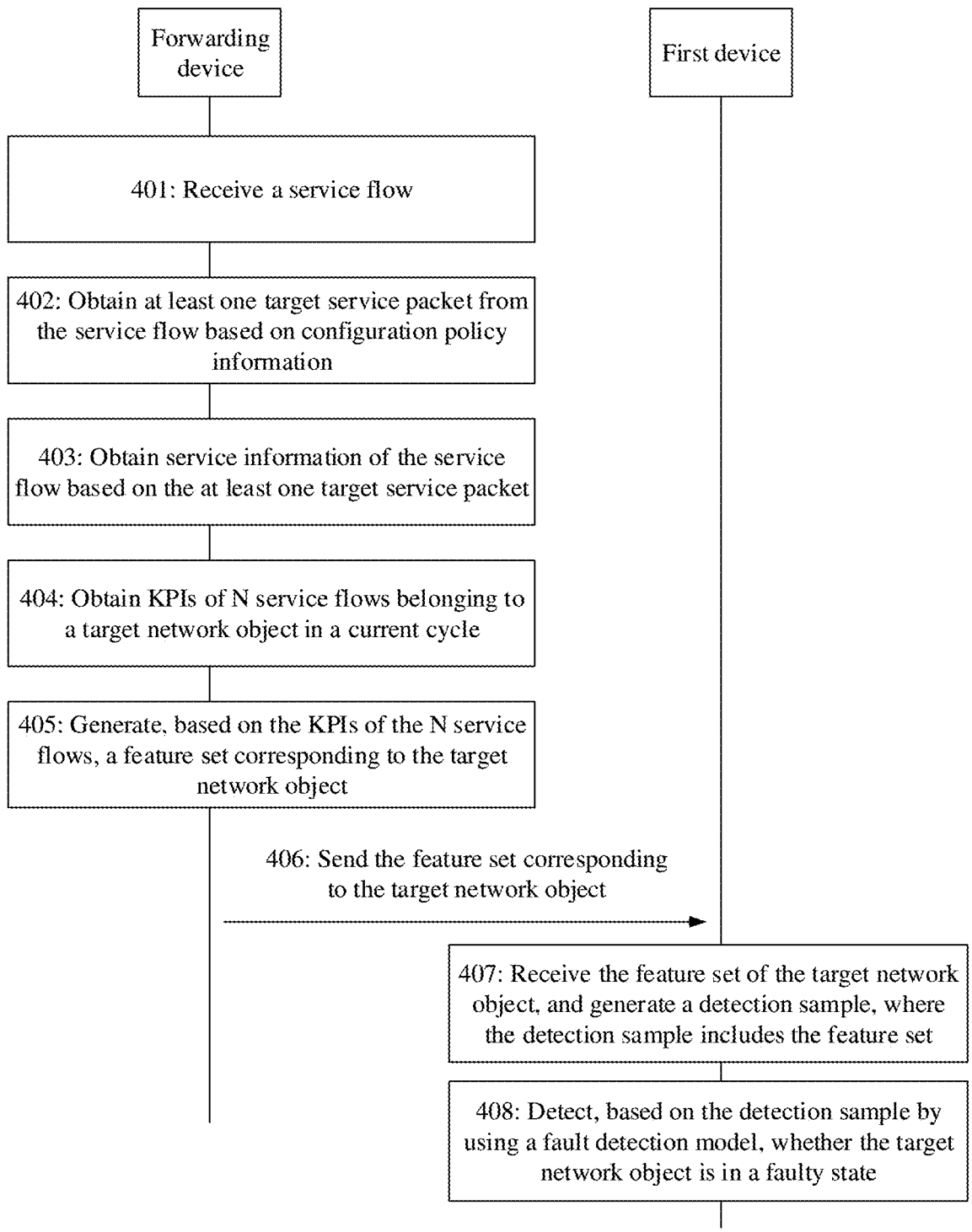
FIG. 8 is a flowchart of another fault detection method according to an embodiment of this application.

In a phase of detecting whether the network object is in the faulty state, the detailed obtaining process in which the forwarding device obtains the detection information and the detailed detection process in which the first device detects the network object are described in detail in a subsequent embodiment shown in FIG. 6 or FIG. 8, and are not described herein.

Refer to FIG. 4. An embodiment of this application provides a fault detection model training method. The training method may be applied to the network architecture provided in any embodiment shown in FIG. 1 to FIG. 3. In the method, a forwarding device obtains service information of a service flow, and sends the service information of the service flow to a first device. The first device receives the service information and trains a fault detection model. The method includes:

Step 101: The forwarding device receives the service flow.

The forwarding device is a device through which a service path used for transmitting the service flow passes. Therefore, the forwarding device receives any service packet that belongs to the service flow. When the forwarding device receives the service packet included in the service flow, the forwarding device may continue to perform an operation in the following step 102.

It should be noted that before this embodiment of this application is performed, a network management device may further send fault configuration information to some network objects and the first device in the network architecture. The fault configuration information includes start time of a first time period and a faulty state. In addition, the network management device sends configuration policy information to the forwarding device, where the configuration policy information includes at least one of at least one preset packet type, a protocol type, and the like.

Optionally, the fault configuration information further includes end time of the first time period. The configuration policy information further includes the faulty state.

The first time period is time for training the fault detection model. To be specific, the fault detection model is obtained through training in the first time period by using the training method provided in this embodiment of this application.

The network management device further sends an object set to the first device, where the object set includes identification information of each network object in the faulty state in the first time period.

When the fault configuration information includes the start time of the first time period and the faulty state, a network object receiving the fault configuration information determines the first time period based on the start time and a duration threshold of the first time period. When the fault configuration information further includes the end time of the first time period, the network object determines the first time period based on the start time and the end time of the first time period. Then, the network object works in the faulty state in the first time period.

When the fault configuration information includes the start time of the first time period and the faulty state, the first device determines the first time period based on the start time and the duration threshold of the first time period.

When the fault configuration information further includes the end time of the first time period, the first device determines the first time period based on the start time and the end time of the first time period. Then, the first device starts to perform, in the first time period, a procedure of training the fault detection model.

When receiving the object set, the first device further stores the received object set.

For the configuration policy information, when the protocol type included in the configuration policy information is Transmission Control Protocol (TCP), the configuration policy information includes the at least one preset packet type. The at least one preset packet type may include at least one of a synchronous (SYN) packet, a synchronous acknowledgment (SYN ACK) packet, a finish (FIN) packet, a reset (RST) packet, or the like. When the protocol type included in the configuration policy information is user datagram protocol (UDP), the configuration policy information may not include the preset packet type.

Optionally, a skilled person enters the start time of the first time period and the faulty state in the network management device. The network management device receives the start time of the first time period and the faulty state. The skilled person may further enter the end time of the first time period to the network management device, and the network management device may further receive the end time of the first time period. The network management device generates the fault configuration information based on the received information.

Optionally, the skilled person enters identification information of some network objects in the network architecture to the network management device, and then the network management device sends the fault configuration information to the network objects based on the identification information of the network objects.

Figure 2:
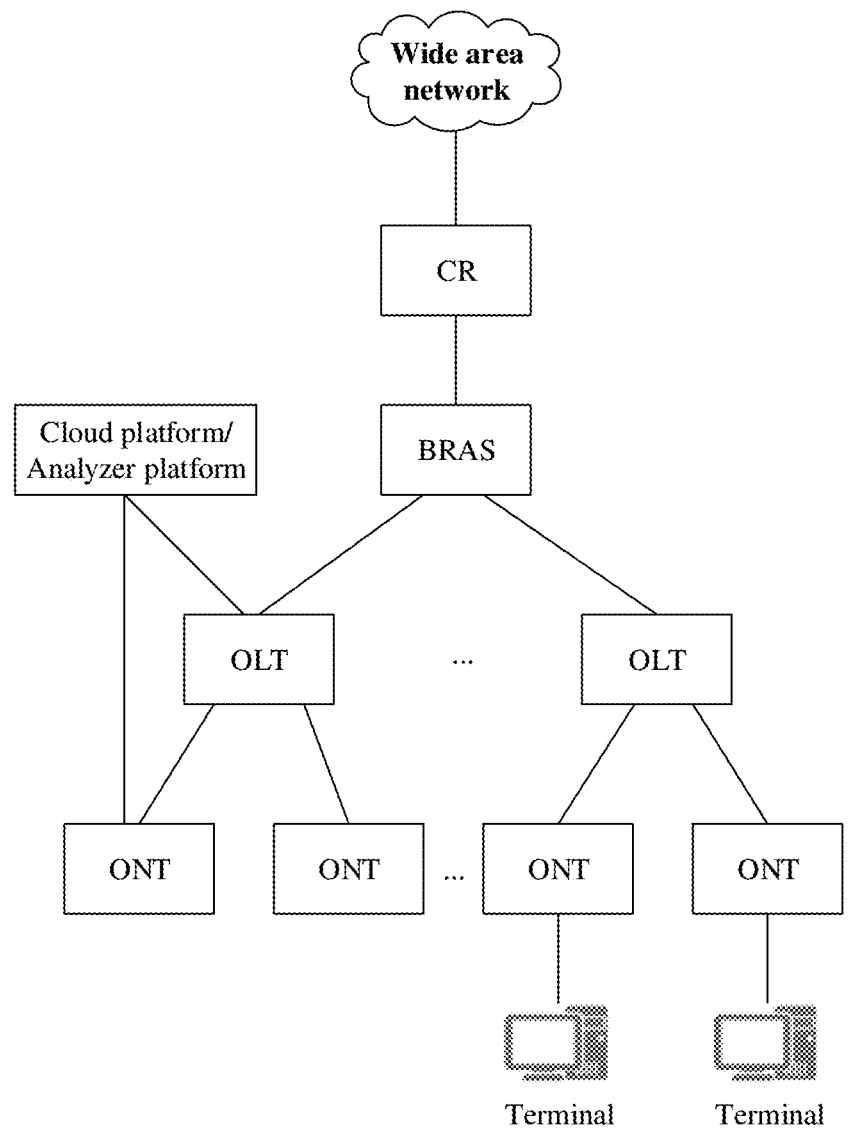
FIG. 2 is a schematic diagram of a structure of a data communications network according to an embodiment of this application.
Figure 3:
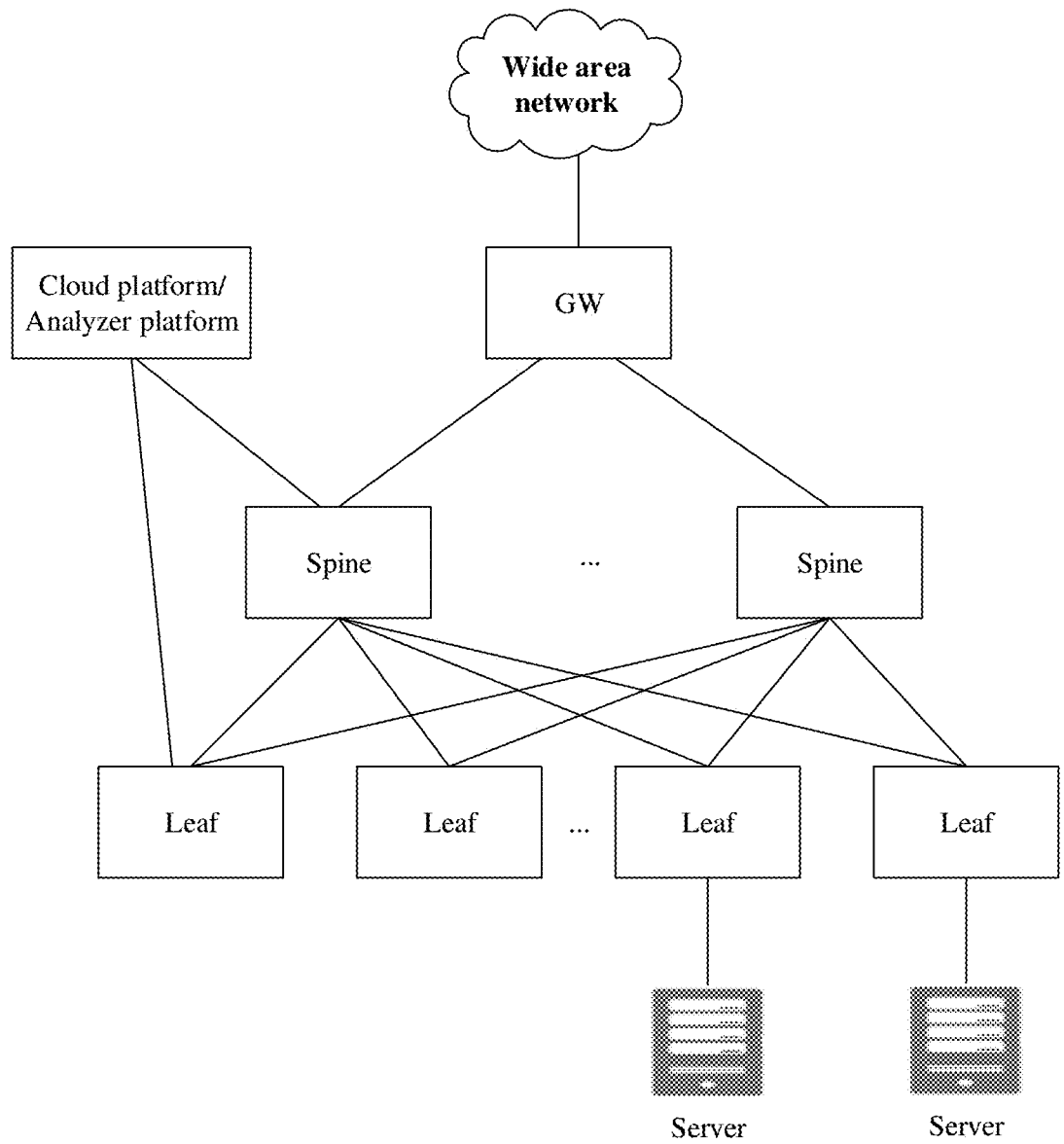
FIG. 3 is a schematic diagram of a structure of a data center network according to an embodiment of this application.

Optionally, the forwarding device may be the ONT or the OLT in the data communications network shown in FIG. 2, or an access device, for example, the leaf in the data center network shown in FIG. 3. The first device is a cloud platform, an analyzer platform, a BRAS in a data communications network, a spine in the data center network, another third-party device, or the like. Alternatively, optionally, the forwarding device may be the BRAS in the data communications network shown in FIG. 2, or a device, for example, the spine or the GW in the data center network shown in FIG. 3. The first device is a cloud platform, an analyzer platform, another third-party device, or the like.

Step 102: The forwarding device obtains at least one target service packet from the service flow based on the configuration policy information.

In this step, when the protocol type included in the configuration policy information is TCP, and the forwarding device receives a service packet, the forwarding device detects whether the protocol type included in the service packet is TCP and whether a packet type of the service packet is a preset packet type included in the configuration policy information. If the protocol type is TCP and the packet type is a preset packet type, the forwarding device uses the service packet as a target service packet and stores the target service packet.

Figure 5:
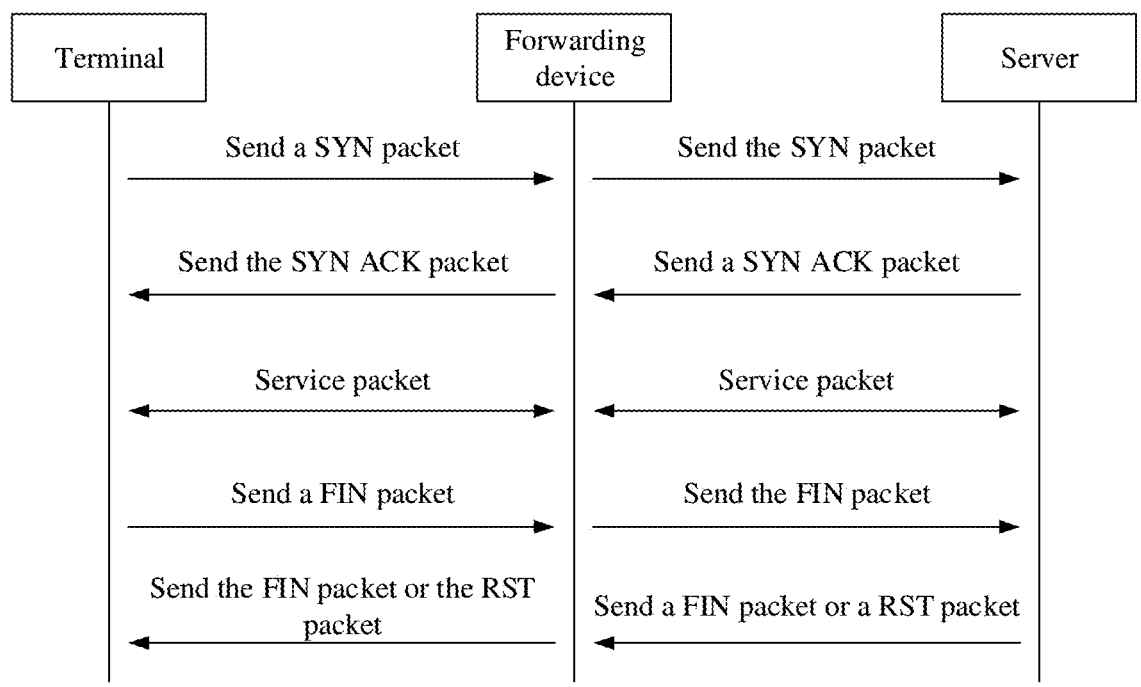
FIG. 5 is a flowchart of service flow transmission according to an embodiment of this application.

Refer to FIG. 5. When a TCP protocol is used to transmit a service flow between a terminal and a server, the terminal first sends an SYN packet to the server, where the SYN packet is used to request to establish a TCP connection between the terminal and the server, and the TCP connection is a service path used for transmitting the service flow between the terminal and the server. After receiving the SYN packet, the server sends an SYN ACK packet to the terminal, and the terminal receives the SYN ACK packet. In this case, the TCP connection between the terminal and the server is established. Then, a service packet is transmitted between the terminal and the server through the TCP connection. When the terminal completes sending or receiving the service flow, the terminal sends a FIN packet to the server. The server receives the FIN packet, and sends a FIN packet or an RST packet to the terminal. The terminal receives the FIN packet or the RST packet, and disconnects the TCP connection to the server.

Based on the foregoing process of transmitting the service flow between the terminal and the server, it may be learned that the first service packet that is of the service flow and sent by the terminal to the server is a SYN packet, and the SYN packet is a start packet used to establish the service path. The first service packet that is of the service flow and sent by the server to the terminal is an SYN ACK packet, and the SYN ACK packet is an end packet used to establish the service path. The last service packet that is of the service flow and sent by the terminal to the server is a FIN packet, and the last service packet that is of the service flow and sent by the server to the terminal is a FIN packet or an RST packet.

When the protocol type included in the configuration policy information is TCP, in this step, the target service packet obtained by the forwarding device from the service flow includes at least one of the SYN packet, the SYN ACK packet, the FIN packet, the RST packet, or the like.

When the protocol type included in the configuration policy information is UDP, and when the forwarding device receives a service packet, the forwarding device detects whether the protocol type included in the service packet is UDP. If the protocol type is UDP, the forwarding device uses the service packet as a target service packet and stores the target service packet.

Step 103: The forwarding device obtains the service information of the service flow based on the at least one target service packet, where the service information includes identification information of at least one network object to which the service flow belongs and M KPIs of the service flow, and the M KPIs are used to describe features of the service flow.

The identification information of the network object may be an address of the network object, or the like. The address may be an Internet Protocol (IP) address, a media access control (MAC) address, or the like.

When the protocol type included in the configuration policy information is TCP, the M KPIs include at least one of a network delay between the forwarding device and the network object, a data volume that is of the service flow and sent by the network object, a data volume that is of the service flow and received by the network object, a status identifier, or the like, and the status identifier identifies a status of the service flow. The network object may be a terminal, a server, or the like.

When the protocol type included in the configuration policy information is UDP, the M KPIs include at least one of a data volume that is of the service flow and sent by the network object, a data volume that is of the service flow and received by the network object, or the like.

In this step, the forwarding device obtains, from the at least one target service packet, target service packets of a same service flow, and obtains the M KPIs of the service flow based on the target service packets of the service flow.

Each target service packet includes quintuple information, and the quintuple information identifies the service flow to which the service packet belongs. The quintuple information may include an address of a source device, an address of a destination device, a port number of the source device, a port number of the destination device, and a protocol type.

Optionally, the forwarding device obtains, from the at least one target service packet, target service packets including same quintuple information, and uses the target service packets as the target service packets of the same service flow.

When a protocol type of the target service packets of the same service flow is TCP, a process in which the forwarding device obtains each KPI is described below one by one. Detailed descriptions are as follows.

For the network delay between the forwarding device and the network object, the network object may be a server or a terminal. When the obtained target service packets include a first target service packet and a second target service packet, the forwarding device obtains the network delay between the forwarding device and the network object based on first time at which the first target service packet is received and second time at which the second target service packet is received. The first target service packet is a packet sent to the network object, the second target service packet is a packet that is sent by the network object and that corresponds to the first target service packet.

Optionally, the first target service packet is a start packet used to establish a service path, and the second target service packet is an end packet used to establish a service path.

Optionally, the network delay between the forwarding device and the network object is obtained by subtracting the first time from the second time.

Optionally, the first target service packet may be a SYN packet sent by the terminal, and the second target service packet may be a SYN ACK packet sent by the server.

For the data volume that is of the service flow and sent by the network object, the network object may be a server or a terminal. When the obtained target service packets include a first start packet and a first end packet, the forwarding device obtains, based on a sequence number of the first start packet and a sequence number of the first end packet, the data volume that is of the service flow and sent by the network object. The first start packet is the $1^{st}$ packet that is of the service flow and sent by the network object, and the first end packet is the last packet that is of the service flow and sent by the network object.

Optionally, the sequence number of the first start packet is subtracted from the sequence number of the first end packet, to obtain a data volume that is of the service flow and sent by the network object.

When the network object is a terminal, the first start packet is a SYN packet sent by the terminal, and the first end packet is a FIN packet sent by the terminal. The forwarding device subtracts a sequence number of the SYN packet from a sequence number of the FIN packet, to obtain a data volume that is of the service flow and sent by the terminal.

When the network object is a server, the first start packet is an SYN ACK packet sent by the server, and the first end packet is a FIN packet or an RST packet sent by the server. The forwarding device subtracts a sequence number of the SYN ACK packet from a sequence number of the FIN packet, to obtain a data volume that is of the service flow and sent by the server. Alternatively, the forwarding device subtracts a sequence number of the SYN ACK packet from a sequence number of the RST packet, to obtain a data volume that is of the service flow and sent by the server.

For the data volume that is of the service flow and received by the network object, the network object may be a server or a terminal. When the obtained target service packets include a second start packet and a second end packet, the forwarding device obtains, based on a sequence number of the second start packet and a sequence number of the second end packet, the data volume that is of the service flow and received by the network object. The second start packet is the $1^{st}$ packet that is of the service flow and received by the network object, and the second end packet is the last packet that is of the service flow and received by the network object.

Optionally, the sequence number of the second start packet is subtracted from the sequence number of the first second packet, to obtain the data volume that is of the service flow and received by the network object.

When the network object is a terminal, the second start packet is an SYN ACK packet received by the terminal, and the second end packet is a FIN packet or an RST packet received by the terminal. The forwarding device subtracts a sequence number of the SYN ACK packet from a sequence number of the FIN packet, to obtain a data volume that is of the service flow and received by the terminal. Alternatively, the forwarding device subtracts a sequence number of the SYN ACK packet from a sequence number of the RST packet, to obtain a data volume that is of the service flow and received by the terminal.

When the network object is a server, the second start packet is an SYN packet received by the server, and the second end packet is a FIN packet received by the server. The forwarding device subtracts a sequence number of the SYN packet from a sequence number of the FIN packet, to obtain a data volume that is of the service flow and received by the server.

For the status identifier, when the obtained target service packet includes the first start packet, in a first time length after third time, if the forwarding device receives the first end packet, the forwarding device sets the status of the service flow identified by the status identifier to a success state; and if the forwarding device does not receive the first end packet, the forwarding device sets the status of the service flow identified by the status identifier to a failure state, where the third time is time at which the first start packet is received. The first start packet is an SYN ACK packet sent by the server, and the first end packet is a FIN packet or an RST packet sent by the server.

When a protocol type of the target service packets of the same service flow is UDP, a process in which the forwarding device obtains each KPI is described below one by one. Detailed descriptions are as follows.

For the data volume that is of the service flow and sent by the network object, the forwarding device determines whether a time length from time at which the last service packet of the service flow is received reaches a second time length. If the time length reaches the second time length, it indicates that the network object has completed transmission of the service flow. The forwarding device obtains, from the target service packets of the service flow, a target service packet whose source device address is the address of the network object, where each obtained target service packet is a service packet sent by the network object; and accumulates data volumes of the obtained target service packets, to obtain the data volume that is of the service flow and sent by the network object.

For example, when the network object is a terminal, the forwarding device obtains, from the target service packets of the service flow, a target service packet whose source device address is an address of the terminal, and accumulates the data volumes of the obtained target service packets, to obtain the data volume that is of the service flow and sent by the terminal. Alternatively, when the network object is a server, the forwarding device obtains, from the target service packets of the service flow, a target service packet whose source device address is an address of the server, and accumulates the data volumes of the obtained target service packets, to obtain the data volume that is of the service flow and sent by the server.

For the data volume that is of the service flow and received by the network object, when determining that the network object has completed transmission of the service flow, the forwarding device obtains, from the target service packets of the service flow, a target service packet whose destination device address is the address of the network object, where each obtained target service packet is a service packet received by the network object; and accumulates the data volumes of the obtained target service packets, to obtain the data volume that is of the service flow and received by the network object.

For example, when the network object is a terminal, the forwarding device obtains, from the target service packets of the service flow, a target service packet whose destination device address is an address of the terminal, and accumulates the data volumes of the obtained target service packets, to obtain the data volume that is of the service flow and received by the terminal. Alternatively, when the network object is a server, the forwarding device obtains, from the target service packets of the service flow, a target service packet whose destination device address is an address of the server, and accumulates the data volumes of the obtained target service packets, to obtain the data volume that is of the service flow and received by the server.

Optionally, when the configuration policy information further includes the faulty state, the forwarding device may determine a type of a to-be-obtained KPI based on the faulty state included in the configuration policy information, and then obtain a KPI of the determined type of the service flow by using this step. The obtained KPI is a KPI related to the faulty state.

Optionally, the forwarding device may store a correspondence between the faulty state and the KPI type, and may determine a type of a to-be-obtained KPI based on the faulty state included in the configuration policy information and the correspondence.

Step 104: The forwarding device sends the service information of the service flow to the first device, where the service information includes the identification information of the at least one network object to which the service flow belongs and the M KPIs of the service flow.

Optionally, the service information may further include collection time for collecting each of the M KPIs, and the collection time of each KPI is used to determine a cycle to which each KPI belongs.

When the first device is an analyzer platform or a cloud platform, a network connection is established between the forwarding device and the analyzer platform or the cloud platform, and the forwarding device sends the service information of the service flow to the analyzer platform or the cloud platform.

When the first device is an upstream device connected to the forwarding device, the forwarding device sends the service information of the service flow to the first device. For example, when the forwarding device is an ONT or an OLT, the upstream device connected to the forwarding device is a BRAS, and the forwarding device sends the service information of the service flow to the BRAS. When the forwarding device is a leaf, the upstream device connected to the forwarding device is a spine, and the forwarding device sends the service information of the service flow to the spine.

For any forwarding device in the network architecture, the any forwarding device performs the foregoing steps 101 to 104 on the received service flow, to obtain and send the service information of the service flow.

Step 105: The first device receives service information of at least one service flow.

The first device continuously receives service information that is of a service flow and sent by different forwarding devices in the network architecture.

Step 106: The first device obtains KPIs of N service flows that are in a first cycle and that belong to a target network object, where N is an integer greater than 0, the first cycle is within a first time period, and the target network object is a network object to which any service flow in the first cycle belongs.

Collection time of each of the KPIs of the N service flows is within the first cycle, and the first cycle may be any cycle.

Optionally, the first cycle may be a current cycle.

In this step, N pieces of service information including identification information of the target network object are obtained from service information of the service flows received in the first cycle, and the KPIs of the N service flows are obtained from the N pieces of service information.

Step 107: The first device generates a training sample based on the KPIs of the N service flows, where the training sample includes a feature set obtained based on the KPIs of the N service flows.

Optionally, for KPIs of any service flow, if the KPIs of the any service flow include another KPI in addition to a KPI related to the faulty state, the first device may determine a type of a to-be-selected KPI based on the faulty state included in the fault configuration information, and then select a KPI of the determined type from the KPIs of the any service flow, that is, select the KPI related to the faulty state. The KPIs of the other N−1 service flows are also processed in the same manner, to obtain KPIs that are of the N service flows and related to the faulty type, and then obtain, based on the KPIs that are of the N service flows and related to the faulty type, the training sample corresponding to the faulty state. The training sample corresponding to the faulty state may be generated by performing the following operations 1071 to 1074.

In this step, one training sample may be generated by performing the following operations 1071 to 1074. The operations 1071 to 1074 may be as follows.

1071: The first device obtains M KPI sets, where any KPI set includes one KPI of each of the N service flows, and types of KPIs included in the any KPI set are the same.

For example, M KPIs of any service flow include a network delay between the forwarding device and the network object, a data volume that is of the service flow and sent by the network object, a data volume that is of the service flow and received by the network object, and a status identifier. Therefore, the M KPI sets obtained by the first device include a network delay set, a sent data volume set, a received data volume set, and a status identifier set.

The network delay set includes N network latencies, and the N network latencies respectively belong to the N service flows. The sent data volume set includes N sent data volumes, and the N sent data volumes respectively belong to the N service flows. The received data volume set includes N received data volumes, and the N received data volumes respectively belong to the N service flows. The status identifier set includes status identifiers of the N service flows.

1072: For any KPI set in the M KPI sets, the first device performs calculation on KPIs included in the any KPI set in at least one first calculation manner, to obtain at least one statistical feature corresponding to the any KPI set.

The at least one first calculation manner includes one or more of the following: collecting statistics about the KPIs in the any KPI set, and calculating an average value, a variance, dispersion, skewness, or kurtosis of the KPIs included in the any KPI set.

The dispersion of the KPIs included in the any KPI set is equal to a ratio of the variance of the KPIs included in the any KPI set to the average value of the KPIs included in the any KPI set.

The skewness of the KPIs included in the any KPI set is $$Skew = E\left[\left(\frac{X_i - \mu}{\sigma}\right)^3\right],$$

where $X_i$ is an $i^{th}$ KPI in the any KPI set, $\sigma$ is the variance of the KPIs included in the any KPI set, $\mu$ is the average value of the KPIs included in the any KPI set, and E is an operation of obtaining an expected value.

The kurtosis of the KPIs included in the any KPI set is $$Kurt = E\left[\left(\frac{X_i - \mu}{\sigma}\right)^4\right],$$

where i=1, 2, . . . , N.

For the network delay set, the first device may calculate at least one of an average value, a variance, dispersion, skewness, kurtosis, or the like of the N network latencies included in the network delay set, to obtain at least one statistical feature corresponding to the network delay set, where the statistical feature includes at least one of the network delay average value, the network delay variance, the network delay dispersion, the network delay skewness, the network delay kurtosis, or the like.

For the sent data volume set, the first device may calculate at least one of an average value, a variance, dispersion, skewness, kurtosis, or the like of the N sent data volumes included in the sent data volume set, to obtain at least one statistical feature corresponding to the sent data volume set, where the statistical feature includes at least one of the sent data volume average value, the sent data volume variance, the sent data volume dispersion, the sent data volume skewness, the sent data volume kurtosis, or the like.

For the received data volume set, the first device may calculate at least one of an average value, a variance, dispersion, skewness, kurtosis, or the like of the N received data volumes included in the received data volume set, to obtain at least one statistical feature corresponding to the received data volume set, where the at least one statistical feature includes at least one of the received data volume average value, the received data volume variance, the received data volume dispersion, the received data volume skewness, the received data volume kurtosis, or the like.

For the status identifier set, the first device may collect statistics on a quantity of status identifiers that identify the success state in the status identifier set and a quantity of status identifiers that identify the failure state in the status identifier set, that is, at least one statistical feature corresponding to the status identifier set, where the statistical feature includes the quantity of status identifiers that identify the success state and/or the quantity of status identifiers that identify the failure state.

Optionally, the first device calculates a proportion of service flows in the success state based on the quantity of status identifiers that identify the success state and the quantity N of status identifiers included in the status identifier set. In addition/Alternatively, the first device calculates a proportion of service flows in the failure state based on the quantity of status identifiers that identify the failure state and the quantity N of status identifiers included in the status identifier set.

Optionally, the first device further obtains at least one statistical feature set. Any statistical feature set includes K statistical features, and the K statistical features are statistical features that are of a same type and obtained through calculation in K cycles. Calculation is performed on the statistical features included in the any statistical feature set in at least one second calculation manner, to obtain at least one time domain feature corresponding to the any statistical feature set.

The K cycles include the first cycle and K−1 cycles before the first cycle, and the at least one second calculation manner includes one or more of the following: calculating a period-on-period value or a difference value between two adjacent statistical features in the statistical feature set, and performing feature fitting on the statistical features in the statistical feature set.

Assuming that a $K^{th}$ cycle is the first cycle, the period-on-period value of the statistical feature set includes a ratio of a statistical feature in a $2^{nd}$ cycle to a statistical feature in a $1^{st}$ cycle, a ratio of a statistical feature in a $3^{rd}$ cycle to a statistical feature in the $2^{nd}$ cycle, . . . , and a ratio of a statistical feature in the $K^{th}$ cycle to a statistical feature in a $(K-1)^{th}$ cycle. In addition, the differential value of the statistical feature set includes a difference between the statistical feature in the $2^{nd}$ cycle and the statistical feature in the $1^{st}$ cycle, a difference between the statistical feature in the $3^{rd}$ cycle and the statistical feature in the $2^{nd}$ cycle, . . . , and a difference between the statistical feature in the $K^{th}$ cycle and the statistical feature in the $(K-1)^{th}$ cycle.

Optionally, the first device may perform feature fitting on the statistical features in the statistical feature set by using the following first formula, to obtain a time domain feature.

The first formula is: $v = \lambda_1 * v_1 + \lambda_2 * v_2 + \ldots + \lambda_K * v_K$.

In the first formula, v is the time domain feature obtained after feature fitting, $\lambda_1, \lambda_2, \ldots,$ and $\lambda_K$ are respectively weights corresponding to the $1^{st}$ cycle, the $2^{nd}$ cycle, . . . , and the $K^{th}$ cycle. A cycle closer to the first cycle corresponds to a larger weight, and $v_1, v_2, \ldots,$ and $v_K$ are respectively the statistical feature in the $1^{st}$ cycle, the statistical feature in the $2^{nd}$ cycle, . . . , and the statistical feature in the $K^{th}$ cycle.

For example, for the statistical feature corresponding to the network delay set, the statistical feature set obtained by the first device may be a network delay average value set, a network delay variance set, a network delay dispersion set, a network delay skewness set, or a network delay kurtosis set. The network delay average value set includes network delay average values obtained by the forwarding device through calculation in the K cycles. The network delay variance set includes network delay variances obtained by the forwarding device through calculation in the K cycles. The network delay skewness set includes network delay skewness obtained by the forwarding device through calculation in the K cycles. The network delay dispersion set includes network delay dispersion obtained by the forwarding device through calculation in the K cycles. The network delay kurtosis set includes network delay kurtosis obtained by the forwarding device through calculation in the K cycles.

The following uses the network delay average value set as an example for description. For a period-on-period value between two adjacent network delay average values in the network delay average value set, the first device calculates a ratio of a network delay average value in the $2^{nd}$ cycle to a network delay average value in the $1^{st}$ cycle, a ratio of a network delay average value in the $3^{rd}$ cycle to a network delay average value in the $2^{nd}$ cycle, ..., and a ratio of a network delay average value in the $K^{th}$ cycle to a network delay average value in the $(K-1)^{th}$ cycle, to obtain the period-on-period value between the two adjacent network delay average values in the network delay average value set.

For a differential value between two adjacent network delay average values in the network delay average value set, the first device calculates a difference between the network delay average value in the $2^{nd}$ cycle and the network delay average value in the $1^{st}$ cycle, a difference between the network delay average value in the $3^{rd}$ cycle and the network delay average value in the $2^{nd}$ cycle, ..., and a difference between the network delay average value in the $K^{th}$ cycle and the network delay average value in the $(K-1)^{th}$ cycle, to obtain the differential value between the two adjacent network delay average values in the network delay average value set.

For performing feature fitting on the K network delay average values in the network delay average value set, the first device respectively replaces $v_1, v_2, \ldots,$ and $v_K$ in the first formula with the K network delay average values, and then performs feature fitting on the K network delay average values according to the first formula, to obtain a time domain feature, where the time domain feature is a moving average value.

The following further uses the network delay variance set an example for description. For a period-on-period value between two adjacent network delay variances in the network delay variance set, the first device calculates a ratio of a network delay variance in the $2^{nd}$ cycle to a network delay variance in the $1^{st}$ cycle, a ratio of a network delay variance in the $3^{rd}$ cycle to a network delay variance in the $2^{nd}$ cycle, ..., and a ratio of a network delay variance in the $K^{th}$ cycle to a network delay variance in the $(K-1)^{th}$ cycle, to obtain the period-on-period value between the two adjacent network delay variances in the network delay variance set.

For a differential value between two adjacent network delay variances in the network delay variance set, the first device calculates a difference between the network delay variance in the $2^{nd}$ cycle and the network delay variance in the $1^{st}$ cycle, a difference between the network delay variance in the $3^{rd}$ cycle and the network delay variance in the $2^{nd}$ cycle, ..., and a difference between the network delay variance in the $K^{th}$ cycle and the network delay variance in the $(K-1)^{th}$ cycle, to obtain the differential value between the two adjacent network delay variances in the network delay variance set.

For performing feature fitting on the K network delay variances in the network delay variance set, the first device respectively replaces $v_1, v_2, \ldots,$ and $v_K$ in the first formula with the K network delay variances, and then performs feature fitting on the K network delay variances according to the first formula, to obtain a time domain feature, where the time domain feature is a moving fluctuation value.

The first device performs a same operation on the network delay dispersion set, the network delay skewness set, or the network delay kurtosis set as the operation performed on the network delay average value set, to obtain at least one time domain feature corresponding to each set.

The first device performs a same operation on a statistical feature corresponding to any other KPI set as the operation performed on the network delay set, to obtain at least one statistical feature set corresponding to the other KPI set, and then performs calculation processing on each statistical feature set in the at least one second calculation manner, to obtain at least one time domain feature corresponding to each statistical feature set. A detailed implementation process is not described one by one.

1073: The first device obtains a feature set, where the feature set includes at least one statistical feature corresponding to each of the M KPI sets.

Optionally, the feature set further includes at least one of at least one time domain feature, a proportion of service flows in the success state, a proportion of service flows in the failure state, or the like corresponding to each statistical feature set.

1074: The first device generates the training sample, where the training sample includes the feature set, or the training sample includes the feature set and a label of the training sample.

Optionally, when the first device determines that a status of the target network object in the first time period is the faulty state, the label of the training sample identifies the faulty state. When the first device determines that the status of the target network object in the first time period is a normal state, the label of the training sample identifies the normal state.

Optionally, the first device determines whether an object set includes the identification information of the target network object. When the object set includes the identification information of the target network object, the first device determines that the status of the target network object in the first time period is the faulty state. When the object set does not include the identification information of the target network object, the first device determines that the status of the target network object in the first time period is the normal state.

The first device repeatedly performs the operations in steps 106 and 107 in the first time period, to obtain a large quantity of training samples, and assembles the obtained large quantity of training samples into a training sample set. Then, an operation of the following step 108 is performed.

Step 108: The first device trains an intelligent model based on the training sample set, to obtain the fault detection model.

In this step, the first device may train the intelligent model in a supervised training manner or an unsupervised training manner.

When the supervised training manner is used, each training sample in the training sample set has corresponding annotation information, and a training process may be as follows.

1081: The first device enters the training sample set into the intelligent model.

Optionally, the first device may enter the training samples included in the training sample set to the intelligent model for a plurality of times, and enter A training samples to the intelligent model each time, where A is an integer greater than 0.

1082: The intelligent model processes each training sample in the training sample set, to obtain a processing result corresponding to each training sample.

Optionally, the intelligent model processes the A entered training samples, to obtain a processing result corresponding to each of the A training samples.

1083: The intelligent model calculates, by using a gradient descent function corresponding to each network parameter included in a parameter set, a gradient matrix based on the annotation information and the processing result corresponding to each training sample, and adjusts at least one network parameter in the intelligent model based on the gradient matrix, where the parameter set includes the at least one network parameter.

For any network parameter in the parameter set, a gradient value corresponding to each training sample is obtained through calculation based on the annotation information and the processing result corresponding to each training sample by using the gradient descent function corresponding to the any network parameter, and the gradient value corresponding to each training sample forms one row of the gradient matrix.

Optionally, the intelligent model obtains, through calculation based on the annotation information and the processing result corresponding to each of the A training samples by using the gradient descent function corresponding to the any network parameter, the gradient value corresponding to each training sample.

If there is a training sample that is in the training sample set and that is not entered, the first device enters A training samples that are not entered into the intelligent model, and then the intelligent model performs the foregoing operations 1082 and 1083. If there is no training sample that is in the training sample set and that is not entered, the following operation 1084 is performed.

1084: The intelligent model calculates a loss function value based on the annotation information and the processing result corresponding to each training sample in the training sample set by using a loss function, and determines, based on the loss function value, whether to continue training. When determining to continue training, the intelligent model returns to perform 1081. When it is determined to stop training, the intelligent model is used as the fault detection model, and no further operation is required.

In this step, when the loss function value is less than a loss threshold, it is determined to stop training. Otherwise, it is determined to continue training.

Optionally, the intelligent model used in the supervised training manner is a support vector machine (SVM), a logistic regression algorithm, a random forest algorithm, or a neural network model. The neural network model may be a deep neural network (DNN), a convolutional neural network (CNN), a recurrent neural network (RNN), a long short-term memory (LSTM), or the like.

When the unsupervised training manner is used, the intelligent model includes an encoder and a decoder, and each training sample in the training sample set has no corresponding annotation information. A training process may be as follows.

1181: The first device enters the training sample set into the intelligent model.

Optionally, the first device may enter the training samples included in the training sample set to the intelligent model for a plurality of times, and enter A training samples to the intelligent model each time.

1182: The intelligent model processes each training sample in the training sample set, to obtain a first processing result corresponding to each training sample.

Optionally, the encoder included in the intelligent model performs encoding processing on the A entered training samples, to obtain a second processing result corresponding to each of the A training samples. The decoder included in the intelligent model performs restoration processing on the second processing result corresponding to each training sample, to obtain the first processing result corresponding to each training sample.

The decoder included in the intelligent model performs restoration processing on the second processing result corresponding to the training sample, to restore the training sample as much as possible. However, there may be a difference between the training sample restored by the decoder and the original training sample. That is, there may be a difference between the original training sample and the first processing result corresponding to the training sample.

1183: The intelligent model calculates, by using a gradient descent function corresponding to each network parameter included in a parameter set, a gradient matrix based on each training sample and the first processing result corresponding to each training sample, and adjusts at least one network parameter in the intelligent model based on the gradient matrix, where the parameter set includes the at least one network parameter.

For any network parameter in the parameter set, a gradient value corresponding to each training sample is obtained through calculation based on each training sample and the first processing result corresponding to each training sample by using the gradient descent function corresponding to the any network parameter, and the gradient value corresponding to each training sample forms one row of the gradient matrix.

Optionally, the intelligent model obtains, through calculation based on each of the A training samples and the first processing result corresponding to each training sample by using the gradient descent function corresponding to the any network parameter, the gradient value corresponding to each training sample.

If there is a training sample that is in the training sample set and that is not entered, the first device enters A training samples that are not entered into the intelligent model, and then the intelligent model performs the foregoing operations 1182 and 1183. If there is no training sample that is in the training sample set and that is not entered, the following operation 1184 is performed:

1184: The intelligent model calculates a loss function value based on each training sample in the training sample set and the first processing result corresponding to each training sample by using a loss function, and determines, based on the loss function value, whether to continue training. When determining to continue training, the intelligent model returns to perform 1181. When it is determined to stop training, the intelligent model is used as the fault detection model, and no further operation is required.

In this step, when the loss function value is less than a loss threshold, it is determined to stop training. Otherwise, it is determined to continue training.

Optionally, the intelligent model used in the unsupervised training manner is a variational autoencoder (VAE) model, a k-means model, or the like.

Optionally, the fault detection model obtained by the first device through training is used to detect whether the network object is in the faulty state, and the faulty state is the faulty state in the fault configuration information sent by the network management device.

The network object may have a plurality of faulty states. For other faulty states, the network management device sends fault configuration information corresponding to the other faulty states to some network objects and the first device in the network architecture. Fault configuration information corresponding to any one of the faulty states is fault configuration information that includes the any faulty state. Then, the forwarding device and the first device train the intelligent model according to the procedure of the foregoing steps 101 to 108, to obtain a fault detection model used to detect the any faulty state. In this way, the fault detection model corresponding to each faulty state is obtained.

For different faulty states, the first device may alternatively train a same intelligent model according to the procedure of the foregoing steps 101 to 108, to obtain a fault detection model, so that the fault detection model can be used to detect different faulty states.

Optionally, the first device may send the obtained feature set to a training device, and the training device receives the feature set and generates the training sample. The training sample includes the feature set, or the training sample includes the feature set and the label of the training sample.

The training device may generate a large quantity of training samples, and train the fault detection model by using the generated training samples. Like the first device, the training device may obtain the fault detection model through training by using the foregoing two training manners. Details are not described herein again.

Optionally, the training device may further send the fault detection model obtained through training to the first device. The first device receives the fault detection model.

Optionally, the training device may not send the fault detection model to the first device. In this way, when detecting the network object, the training device may function as a detection device to detect the network object.

In this embodiment of this application, when receiving the service flow, the forwarding device obtains the service information of the service flow, where the service flow includes the identification information of the network object and M KPIs. In this way, a data volume of the service information is far less than a data volume of the service flow. Therefore, when the forwarding device sends the service information of the service flow to the first device, consumption of network resources, especially bandwidth resources, is greatly reduced. In addition, the first device may be a cloud platform or an analyzer platform. All forwarding devices in the network architecture send the service information of the service flow to the cloud platform or the analyzer platform, and the cloud platform or the analyzer platform may uniformly obtain the fault detection model through training. However, because there are a large quantity of forwarding devices and bandwidth resources of the cloud platform or the analyzer platform are limited, it may take long time to receive the service information. As a result, training time is prolonged. However, the first device may be an upstream device connected to the forwarding device, and each upstream device receives the service information that is of the service flow and sent by the forwarding device connected to the upstream device. In this way, training is separately performed by different forwarding devices, so that training efficiency can be improved.

Refer to FIG. 6. An embodiment of this application provides a fault detection method. The detection method may be applied to the network architecture provided in any embodiment shown in FIG. 1 to FIG. 3. In the method, a forwarding device obtains service information of a service flow received by the forwarding device, and sends the service information of the service flow to a first device. The first device receives the service information that is of the service flow and sent by the forwarding device, generates a detection sample based on the received service information, and detects a network object based on the detection sample by using a fault detection model. The fault detection model may be obtained through training in the embodiment shown in FIG. 4. The method includes steps 201 to 208.

Steps 201 to 205 are respectively the same as steps 101 to 105, and are not described in detail herein again.

It should be noted that the forwarding device obtains the service information of the service flow, and KPIs in the service information include a KPI related to each faulty state in at least one faulty state.

Optionally, the service information may further include collection time of the KPI, and the collection time of the KPI is used to determine a cycle to which the KPI belongs.

Step 206: The first device obtains KPIs of N service flows that are in a current cycle and that belong to a target network object, where N is an integer greater than 0, and the target network object is a network object to which any service flow in the current cycle belongs.

Collection time of the KPIs of the N service flows is within the current cycle.

Optionally, the forwarding device may be the ONT or the OLT in the data communications network shown in FIG. 2, or an access device, for example, the leaf in the data center network shown in FIG. 3. The first device is a cloud platform, an analyzer platform, a BRAS in a data communications network, a spine in the data center network, another third-party device, or the like. Alternatively, optionally, the forwarding device may be the BRAS in the data communications network shown in FIG. 2, or a device, for example, the spine in the data center network shown in FIG. 3. The first device is a cloud platform, an analyzer platform, another third-party device, or the like.

Step 207: The first device generates a detection sample based on the KPIs of the N service flows, where the detection sample includes a feature set obtained based on the KPIs of the N service flows.

A process of generating the detection sample by the first device is the same as the process of generating the training sample in step 107 in the embodiment shown in FIG. 4. Details are not described herein again.

Optionally, for KPIs of any service flow, the first device may determine a type of a to-be-selected KPI based on a faulty state, and then select a KPI of the determined type from the KPIs of the any service flow, that is, select a KPI related to the faulty state. KPIs of other N−1 service flows are also processed in the same manner, to obtain KPIs that are of the N service flows and related to the faulty type. Then, one detection sample corresponding to the faulty state is generated based on the KPIs that are of the N service flows and related to the faulty type. For a process of generating the detection sample corresponding to the faulty state, refer to the process of generating the training sample corresponding to the faulty state by performing the operations in steps 1071 to 1074 shown in FIG. 4. In this way, the first device may generate detection samples corresponding to different faulty states.

Optionally, the first device may not distinguish between different faulty states, that is, generate one detection sample based on the KPIs of the N service flows. The detection sample includes the detection samples corresponding to different faulty states.

Step 208: The first device detects, based on the detection sample by using the fault detection model, whether the target network object is in the faulty state.

Optionally, the first device includes fault detection models corresponding to a plurality of different faulty states. For the fault detection model corresponding to any faulty state, the first device detects, based on a detection sample corresponding to the any faulty state by using the fault detection model corresponding to the any faulty state, whether the target network object is in the any faulty state. In this way, the target network object is detected by using the fault detection model corresponding to each faulty state, and it is detected that the target network object may be in one or more faulty states.

Optionally, the first device includes a plurality of fault detection models corresponding to different faulty states. The first device may detect, based on detection samples corresponding to different faulty states by using the fault detection models corresponding to different faulty states, that the target network object may be in one or more faulty states.

Optionally, the first device includes one fault detection model that can detect different faulty states. The first device generates a detection sample in step 207, and detects, based on the detection sample by using the fault detection model, whether the target network object is in one or more faulty states.

Optionally, when detecting that the target network object is in the faulty state, the first device obtains at least one KPI of the target network object and/or a service flow of the target network object, and performs fault locating based on the at least one KPI of the target network object and/or the service flow of the target network object.

The at least one KPI of the target network object may include at least one of CPU usage, memory usage, a throughput rate, or the like of the target network object.

The first device may determine a target forwarding device, and send a collection instruction to the target forwarding device, where the target forwarding device is a forwarding device that sends service information of the service flow belonging to the target network object, and the collection instruction includes identification information of the target network object.

The target forwarding device receives the collection instruction, mirrors, based on the identification information that is of the target network object and included in the collection instruction, the received service flow belonging to the target network object, and sends a service flow obtained through mirroring to the first device.

Only when it is detected that the target network object is in the faulty state, the forwarding device mirrors the received service flow belonging to the target network object, and sends the service flow obtained through mirroring to the first device. In this way, on-demand collection is implemented, and collection of service flows of all network objects is avoided, to save bandwidth resources, and save computing resources required for parsing unnecessary data when the first device performs fault locating.

If the first device does not include the fault detection model, and the fault detection model is located in the third-party device, the first device may send the obtained detection sample to the third-party device. The third-party device receives the detection sample, and detects, based on the detection sample by using the fault detection model, whether the target network object is in the faulty state.

In this embodiment of this application, when receiving the service flow, the forwarding device obtains the service information of the service flow, where the service flow includes the identification information of the network object and M KPIs. In this way, a data volume of the service information is far less than a data volume of the service flow. Therefore, when the forwarding device sends the service information of the service flow to the first device, consumption of network resources, especially bandwidth resources, is greatly reduced. In addition, the first device may be a cloud platform or an analyzer platform. All forwarding devices in the network architecture send the service information of the service flow to the cloud platform or the analyzer platform, and the cloud platform or the analyzer platform may uniformly detect the network object. However, due to a large quantity of forwarding devices and limited bandwidth resources of the cloud platform or the analyzer platform, it may take long time to receive the service information. As a result, detection time is prolonged. However, the first device may be an upstream device connected to the forwarding device. The upstream device receives the service information that is of the service flow and sent by the forwarding device connected to the upstream device. In this way, the upstream device performs detection, so that detection efficiency can be improved, and real-time detection is implemented.

Refer to FIG. 7. An embodiment of this application provides a fault detection model training method. The training method may be applied to the network architecture provided in any embodiment shown in FIG. 1 to FIG. 3. In the method, a forwarding device obtains service information of a service flow, obtains a feature set based on the service information, and sends the feature set to a first device. The first device receives the feature set and trains a fault detection model. The method includes steps 301 to 308.

Steps 301 to 303 are respectively the same as steps 101 to 103, and are not described in detail herein again.

Step 304: The forwarding device obtains KPIs of N service flows that are in a first cycle and that belong to a target network object, where N is an integer greater than 0, the first cycle is within a first time period, and the target network object is a network object to which any service flow in the first cycle belongs.

Collection time of each of the KPIs of the N service flows is within the first cycle, and the first cycle may be any cycle. Optionally, the first cycle may be a current cycle.

Step 305: The forwarding device generates, based on the KPIs of the N service flows, a feature set corresponding to the target network object.

The forwarding device may refer to a process in which the first device generates the feature set in 1071 to 1073 in the embodiment shown in FIG. 4. Details are not described herein again.

Step 306: The forwarding device sends the feature set corresponding to the target network object to the first device.

The forwarding device may repeatedly perform operations in the foregoing steps 301 to 306 to obtain feature sets of different network objects, and send, to the first device, the feature sets corresponding to different network objects.

Step 307: The first device receives the feature set of the target network object, and generates a training sample, where the training sample includes the feature set, or the training sample includes the feature set and a label of the training sample.

When the target network object is in a faulty state, the label of the training sample identifies the faulty state. When the target network object is in a normal state, the label of the training sample identifies the normal state.

The first device may receive a feature set that is of at least one network object and sent by different forwarding devices, generate a large quantity of training samples, and then train the fault detection model by performing an operation in the following step 308.

Step 308 is the same as step 108, and is not described in detail herein again.

Optionally, the forwarding device may be the BRAS in the data communications network shown in FIG. 2, or a device, for example, the spine in the data center network shown in FIG. 3. The first device is a cloud platform, an analyzer platform, another third-party device, or the like.

In this embodiment of this application, when receiving the service flow, the forwarding device obtains the service information of the service flow, and obtains the feature set based on the service information of the service flow, where the service information includes identification information of the network object and the M KPIs. In this way, a data volume of the feature set is far less than a data volume of the service flow. Therefore, when the forwarding device sends the feature set to the first device, consumption of network resources, especially bandwidth resources, is greatly reduced.

Refer to FIG. 8. An embodiment of this application provides a fault detection method. The detection method may be applied to the network architecture provided in any embodiment shown in FIG. 1 to FIG. 3. In the method, a forwarding device obtains service information of a service flow received by the forwarding device, generates a feature set based on the service information of the service flow, and sends the feature set to a first device. The first device receives the feature set, generates a detection sample based on the feature set, and detects the network object based on the detection sample by using a fault detection model. The fault detection model may be obtained through training in the embodiment shown in FIG. 4 or FIG. 7. The method includes steps 401 to 408.

Steps 401 to 403 are respectively the same as steps 301 to 303, and are not described in detail herein again.

Step 404: The forwarding device obtains KPIs of N service flows that are in a current cycle and that belong to a target network object, where N is an integer greater than 0, and the target network object is a network object to which any service flow in the current cycle belongs.

Collection time of the KPIs of the N service flows is within the current cycle.

Steps 405 to 406 are respectively the same as steps 305 to 306, and are not described in detail herein again.

Step 407: The first device receives a feature set of the target network object, and generates a detection sample, where the detection sample includes the feature set.

Step 408 is the same as step 208, and is not described in detail herein again.

Optionally, the forwarding device may be the BRAS in the data communications network shown in FIG. 2, or a device, for example, the spine in the data center network shown in FIG. 3. The first device is a cloud platform, an analyzer platform, another third-party device, or the like.

In this embodiment of this application, when receiving the service flow, the forwarding device obtains the service information of the service flow, and obtains the feature set based on the service information of the service flow, where the service information includes identification information of the network object and M KPIs. In this way, a data volume of the feature set is far less than a data volume of the service flow. Therefore, when the forwarding device sends the feature set to the first device, consumption of network resources, especially bandwidth resources, is greatly reduced.

Figure 9:
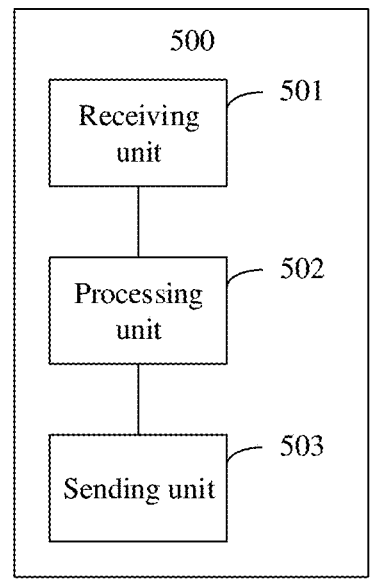
FIG. 9 is a schematic diagram of a structure of a fault detection apparatus according to an embodiment of this application.

Refer to FIG. 9. An embodiment of this application provides a fault detection apparatus 500. The apparatus 500 may be deployed on the forwarding device in any one of the foregoing embodiments, and includes: a receiving unit 501, configured to receive at least one service flow; a processing unit 502, configured to obtain service information of the at least one service flow, where each piece of service information of a service flow includes identification information of a network object to which the service flow belongs and M key performance indicators KPIs of the service flow, M is an integer greater than 0, and the network object includes one or more devices; and a sending unit 503, configured to send detection information to a first device, where the detection information includes the service information of the at least one service flow or a feature set obtained based on the service information of the at least one service flow, and the detection information is used to detect whether the network object is in a faulty state.

Optionally, a protocol type of the service flow is transmission control protocol TCP, and the processing unit 502 is configured to: obtain at least one target service packet from the service flow based on configuration policy information, where the configuration policy information includes at least one preset packet type; and obtain the M KPIs of the service flow based on the at least one target service packet.

Optionally, the M KPIs include a network delay between the apparatus and the network object, and/or a data volume that is of the service flow and sent by the network object and a data volume that is of the service flow and received by the network object.

The processing unit 502 is configured to: when the at least one target service packet includes a first target service packet and a second target service packet, obtain the network delay between the apparatus and the network object based on first time at which the first target service packet is received and second time at which the second target service packet is received, where the first target service packet is a packet sent to the network object, and the second target service packet is a packet that is sent by the network object and that corresponds to the first target service packet; and/or when the at least one target service packet includes a first start packet and a first end packet, obtain, based on a sequence number of the first start packet and a sequence number of the first end packet, the data volume that is of the service flow and sent by the network object, where the first start packet is the $1^{st}$ packet that is of the service flow and sent by the network object, and the first end packet is the last packet that is of the service flow and sent by the network object; and/or when the at least one target service packet includes a second start packet and a second end packet, obtain, based on a sequence number of the second start packet and a sequence number of the second end packet, the data volume that is of the service flow and received by the network object, where the second start packet is the $1^{st}$ packet that is of the service flow and received by the network object, and the second end packet is the last packet that is of the service flow and received by the network object.

Optionally, the M KPIs include a status identifier, and the status identifier identifies a status of the service flow.

The processing unit 502 is configured to: when the at least one target service packet includes the first start packet, in a first time length after third time, if the first end packet is received, set the status identified by the status identifier to a success state; or if the first end packet is not received, set the status identified by the state identifier to a failure state, where the third time is time at which the first start packet is received, the first start packet is the 1$^{st}$ packet that is of the service flow and sent by the network object, and the first end packet is the last packet that is of the service flow and sent by the network object.

Optionally, the processing unit 502 is further configured to: obtain, from the at least one service flow, KPIs of N service flows that are in a current cycle and that belong to a target network object, where the target network object is a network object to which any one of the at least one service flow belongs, and N is an integer greater than 0; and obtain a feature set based on the KPIs of the N service flows.

Optionally, the feature set includes at least one statistical feature, and the processing unit 502 is configured to: obtain M KPI sets, where any KPI set includes one KPI of each of the N service flows, and types of the KPIs included in the any KPI set are the same; and perform calculation on the KPIs included in the any KPI set, to obtain at least one statistical feature corresponding to the any KPI set in at least one first calculation manner, where the at least one first calculation manner includes one or more of the following: collecting statistics about the KPIs in the any KPI set, and calculating an average value, a variance, dispersion, skewness, or kurtosis of the KPIs included in the any KPI set.

Optionally, the feature set further includes at least one time domain feature, and the processing unit 502 is further configured to: perform calculation on statistical features included in the statistical feature set in at least one second calculation manner, to obtain at least one time domain feature.

The statistical feature set includes K statistical features, the K statistical features are statistical features that are of a same type and obtained through calculation in K cycles, and the K cycles include the current cycle and K−1 cycles before the current cycle. The at least one second calculation manner includes one or more of the following: calculating a period-on-period value or a differential value between two adjacent statistical features in the statistical feature set, and performing feature fitting on the statistical features in the statistical feature set.

Optionally, the any KPI set includes status identifiers of the N service flows, and the status identifier of any one of the N service flows identifies a status of the any service flow. The statistical feature of the any KPI set includes a quantity of status identifiers that identify the success state and a quantity of status identifiers that identify the failure state. The feature set further includes a proportion of service flows in the success state and/or a proportion of service flows in the failure state.

The processing unit 502 is further configured to: calculate the proportion of the service flows in the success state based on the quantity of status identifiers that identify the success state and a quantity of KPIs included in the any KPI set; and/or calculate the proportion of the service flows in the failure state based on the quantity of status identifiers that identify the failure state and the quantity of KPIs included in the any KPI set.

Optionally, the first device is a cloud platform, an analyzer platform, or an upstream device of the apparatus.

Optionally, the network object is a terminal, a server, a client, a virtual machine, a router, a switch, a device in a VLAN, or a device in a network segment.

Optionally, the M KPIs are used to describe features of the service flow.

In this embodiment of this application, the receiving unit receives the at least one service flow. The processing unit obtains the service information of the at least one service flow. The service information of the service flow includes the identification information of the network object to which the service flow belongs and the M KPIs of the service flow. The sending unit sends detection information to the first device. Because the detection information obtained by the processing unit includes the identification information of the network object and M KPIs or a feature set obtained based on the M KPIs of the network object, a data volume of the detection information is far less than that of the service flow, and network resources required for sending the detection information by the sending unit to the first device are far less than network resources required for sending the service flow by the sending unit to the first device. In this way, consumption of network resources is reduced. Because the data volume of the detection information is small, when the receiving unit receives the service flow, the processing unit may obtain the detection information, and the sending unit sends the detection information to the first device, so that the first device can perform real-time detection, to detect the network object in the faulty state in a timely manner, so as to improve detection efficiency.

Figure 10:
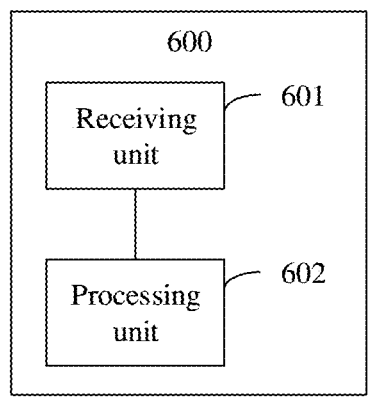
FIG. 10 is a schematic diagram of a structure of another fault detection apparatus according to an embodiment of this application.

Refer to FIG. 10. An embodiment of this application provides a fault detection apparatus 600. The apparatus 600 is deployed on the first device according to any one of the foregoing embodiments, and includes: a receiving unit 601, configured to receive service information that is of at least one service flow and sent by a forwarding device, where the service information of the service flow includes identification information of a network object to which the service flow belongs and M KPIs of the service flow, M is an integer greater than 0, and the network object includes one or more devices; and a processing unit 602, configured to detect, based on the service information of the at least one service flow by using a fault detection model, whether the network object is in a faulty state; or obtain, based on the service information of the at least one service flow, at least one feature set used to detect the network object.

Optionally, the processing unit 602 is configured to: obtain, from the at least one service flow, KPIs of N service flows that are in a current cycle and that belong to a target network object, where the target network object is a network object to which any one of the at least one service flow belongs, and N is an integer greater than 0; obtain a feature set based on the KPIs of the N service flows; and detect, based on the feature set by using the fault detection model, whether the target network object is in the faulty state.

Optionally, the feature set includes at least one statistical feature, and the processing unit 602 is configured to: obtain M KPI sets, where any KPI set includes one KPI of each of the N service flows, and types of the KPIs included in the any KPI set are the same; and perform calculation on the KPIs included in the any KPI set in at least one first calculation manner, to obtain at least one statistical feature corresponding to the any KPI set, where the at least one first calculation manner includes one or more of the following: collecting statistics about the KPIs in the any KPI set, and calculating an average value, a variance, dispersion, skewness, or kurtosis of the KPIs included in the any KPI set.

Optionally, the feature set further includes at least one time domain feature, and the processing unit 602 is further configured to: perform calculation on statistical features included in the statistical feature set in at least one second calculation manner, to obtain at least one time domain feature.

The statistical feature set includes K statistical features, the K statistical features are statistical features that are of a same type and obtained through calculation in K cycles, and the K cycles include the current cycle and K−1 cycles before the current cycle. The at least one second calculation manner includes one or more of the following: calculating a period-on-period value or a differential value between two adjacent statistical features in the statistical feature set, and performing feature fitting on the statistical features in the statistical feature set.

Optionally, the any KPI set includes status identifiers of the N service flows, and the status identifier of any one of the N service flows identifies a status of the any service flow. The statistical feature of the any KPI set includes a quantity of status identifiers that identify a success state and a quantity of status identifiers that identify a failure state. The feature set further includes a proportion of service flows in the success state and/or a proportion of service flows in the failure state.

The processing unit 602 is further configured to: calculate the proportion of the service flows in the success state based on the quantity of status identifiers that identify the success state and a quantity of KPIs included in the any KPI set; and/or calculate the proportion of the service flows in the failure state based on the quantity of status identifiers that identify the failure state and the quantity of KPIs included in the any KPI set.

Optionally, the M KPIs of the service flow include at least one of a network delay between the network object and the forwarding device, a data volume that is of the service flow and sent by the network object, a data volume that is of the service flow and received by the network object, or a status identifier of the service flow. The status identifier identifies a status of the service flow.

Optionally, the processing unit 602 is further configured to: when it is detected that the target network object is in the faulty state, obtain at least one KPI of the target network object and/or a service flow of the target network object, and perform fault locating based on the at least one KPI of the target network object and/or the service flow of the target network object.

In this embodiment of this application, the receiving unit receives the service information that is of the at least one service flow and sent by the forwarding device. The service information of the service flow includes the identification information of the network object to which the service flow belongs and the M KPIs of the service flow. The processing unit detects the network object based on the service information of the at least one service flow by using the fault detection model, or obtains at least one feature set used to detect the network object. Because the service information sent by the forwarding device includes the identification information of the network object and KPIs, a data volume of the service information is far less than a data volume of the service flow. In this way, network resources consumed when the receiving unit receives the service information are reduced. Because the data volume of the service information is small, when receiving the service flow, the forwarding device may obtain the service information and send the service information. Therefore, the receiving unit may receive the service information, and the processing unit may perform real-time detection to detect the network object in the faulty state in a timely manner, so as to improve detection efficiency.

Figure 11:
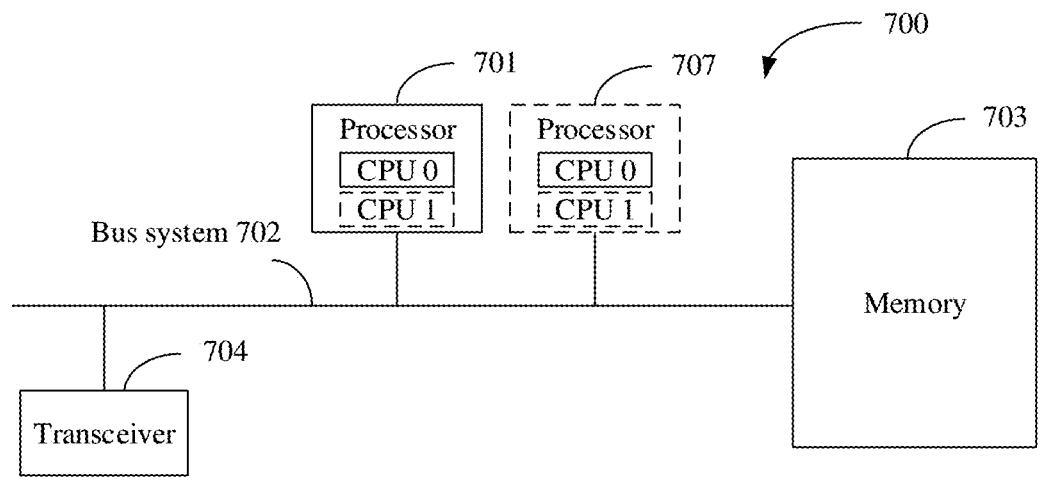
FIG. 11 is a schematic diagram of a structure of still another fault detection apparatus according to an embodiment of this application.

FIG. 11 is a schematic diagram of a fault detection apparatus 700 according to an embodiment of this application. The apparatus 700 may be the forwarding device in any one of the foregoing embodiments. The apparatus 700 includes at least one processor 701, a bus system 702, a memory 703, and at least one transceiver 704.

The apparatus 700 is an apparatus of a hardware structure, and can be configured to implement functional modules in the apparatus 500 in FIG. 9. For example, a person skilled in the art may figure out that the processing unit 502 in the apparatus 500 shown in FIG. 9 may be implemented by the at least one processor 701 by invoking code in the memory 703, and the receiving unit 501 and the sending unit 503 in the apparatus 500 shown in FIG. 9 may be implemented by the transceiver 704.

Optionally, the processor 701 may be a general-purpose central processing unit (CPU), a network processor (NP), a microprocessor, an application-specific integrated circuit (ASIC), or one or more integrated circuits configured to control program execution of the solutions of this application.

The bus system 702 may include a path for transmitting information between the foregoing components.

The transceiver 704 is configured to communicate with another device or a communications network.

The memory 703 may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and that can be accessed by a computer, but the memory 703 is not limited thereto. The memory may exist independently, and is connected to the processor by using the bus. Alternatively, the memory may be integrated into the processor.

The memory 703 is configured to store application program code that executes the solution in this application, and the processor 701 controls execution of the solution in this application. The processor 701 is configured to execute the application program code stored in the memory 703, to implement functions in the method in the present patent.

In specific implementations, in an embodiment, the processor 701 may include one or more CPUs, for example, a CPU 0 and a CPU 1 in FIG. 11.

During specific implementation, in an embodiment, the apparatus 700 may include a plurality of processors, for example, a processor 701 and a processor 707 in FIG. 11. Each of these processors may be a single-core (single-CPU) processor, or may be a multi-core (multi-CPU) processor. The processor herein may be one or more devices, circuits, and/or processing cores configured to process data (for example, computer program instructions).

Figure 12:
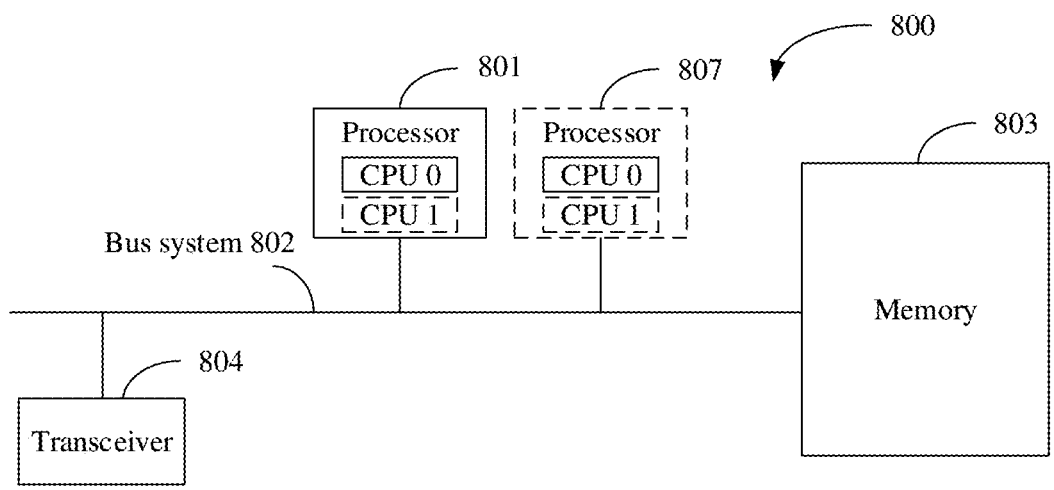
FIG. 12 is a schematic diagram of a structure of yet another fault detection apparatus according to an embodiment of this application.

FIG. 12 is a schematic diagram of a fault detection apparatus 800 according to an embodiment of this application. The apparatus 800 may be the forwarding device in any one of the foregoing embodiments. The apparatus 800 includes at least one processor 801, a bus system 802, a memory 803, and at least one transceiver 804.

The apparatus 800 is an apparatus of a hardware structure, and can be configured to implement functional modules in the apparatus 600 in FIG. 10. For example, a person skilled in the art may figure out that the processing unit 602 in the apparatus 600 shown in FIG. 10 may be implemented by the at least one processor 801 by invoking code in the memory 803, and the receiving unit 601 in the apparatus 600 shown in FIG. 10 may be implemented by the transceiver 804.

Optionally, the processor 801 may be a CPU, a NP, a microprocessor, an ASIC, or one or more integrated circuits configured to control program execution of the solutions of this application.

The bus system 802 may include a path to transmit information between the foregoing components.

The transceiver 804 is configured to communicate with another device or a communications network.

The memory 803 may be a ROM or another type of static storage device that can store static information and instructions, a RAM or another type of dynamic storage device that can store information and instructions, an EEPROM, a CD-ROM or another compact disc storage medium, an optical disc storage medium (including a compact disc, a laser disc, an optical disc, a digital versatile disc, a BLU-RAY optical disc, or the like), a magnetic disk storage medium or another magnetic storage device, or any other medium that can carry or store expected program code in a form of an instruction or a data structure and that can be accessed by a computer, but the memory 803 is not limited thereto. The memory may exist independently, and is connected to the processor by using the bus. Alternatively, the memory may be integrated with the processor.

The memory 803 is configured to store application program code that executes the solution in this application, and the processor 801 controls execution of the solution in this application. The processor 801 is configured to execute the application code stored in the memory 803, to implement a function in the method in this patent.

In a specific implementation, in an embodiment, the processor 801 may include one or more CPUs such as a CPU 0 and a CPU 1 shown in FIG. 12. In a specific implementation, in an embodiment, the apparatus 800 may include a plurality of processors, for example, a processor 801 and a processor 807 in FIG. 12. Each of these processors may be a single-core (single-CPU) processor, or may be a multi-core (multi-CPU) processor. The processor herein may be one or more devices, circuits, and/or processing cores configured to process data (for example, computer program instructions).

Figure 13:
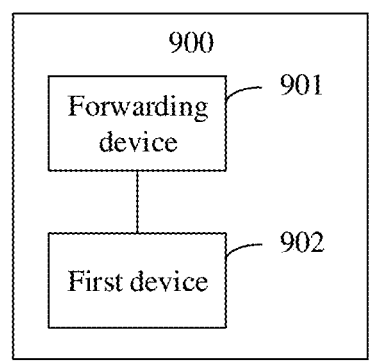
FIG. 13 is a schematic diagram of a structure of a fault detection system according to an embodiment of this application.

Refer to FIG. 13. An embodiment of this application provides a fault detection system 900. The system 900 includes the apparatus in the embodiment shown in FIG. 9 and the apparatus in the embodiment shown in FIG. 10, or the apparatus in the embodiment shown in FIG. 11 and the apparatus in the embodiment shown in FIG. 12.

The apparatus in the embodiment shown in FIG. 9 or FIG. 11 may be a forwarding device 901, and the apparatus in the embodiment shown in FIG. 10 or FIG. 12 may be a first device 902.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A method, comprising:
   receiving, by a forwarding device, a service flow;
   obtaining, by the forwarding device, service information of the service flow, wherein the service information of the service flow comprises identification information of a network object to which the service flow belongs and M key performance indicators (KPIs) of the service flow, M is an integer greater than 0, and the network object comprises a device,
   wherein the M KPIs comprises, based on a target service packet from the service flow further based on configuration policy information:
     a network delay between the forwarding device and the network object to which the service flow belongs,
     a first data volume that is of the service flow and sent by the network object,
     a second data volume that is of the service flow and received by the network object, or
     a status identifier that identifies a status of the service flow; and
   sending, by the forwarding device, detection information to a first device to detect whether the network object is in a faulty state, wherein the detection information comprises the service information of the service flow or a feature set obtained based on the service information of the service flow.

2. The method according to claim 1, wherein:
   a protocol type of the service flow is Transmission Control Protocol (TCP); and
   the method further comprises:
     obtaining, by the forwarding device, the target service packet from the service flow based on the configuration policy information, wherein the configuration policy information comprises a preset packet type; and
     obtaining, by the forwarding device, the M KPIs of the service flow based on the target service packet.

3. The method according to claim 2, wherein:
   obtaining, by the forwarding device, the M KPIs of the service flow based on the target service packet comprises:
     obtaining, by the forwarding device in response to the target service packet comprising a first target service packet and a second target service packet, the network delay between the forwarding device and the network object based on a first time at which the first target service packet is received and a second time at which the second target service packet is received, wherein the first target service packet is a packet sent to the network object, and the second target service packet is a packet that is sent by the network object and that corresponds to the first target service packet; or
     obtaining, by the forwarding device in response to the target service packet comprising a first start packet and a first end packet, and based on a sequence number of the first start packet and a sequence number of the first end packet, the first data volume that is of the service flow and sent by the network object, wherein the first start packet is a first packet of the service flow and sent by the network object, and the first end packet is a last packet of the service flow and sent by the network object; or obtaining, by the forwarding device in response to the target service packet comprising a second start packet and a second end packet, and based on a sequence number of the second start packet and a sequence number of the second end packet, the second data volume that is of the service flow and received by the network object, wherein the second start packet is a first packet of the service flow and received by the network object, and the second end packet is a last packet of the service flow and received by the network object.

4. The method according to claim 2, wherein:
the method further comprises setting, by the forwarding device in response to the target service packet comprising a first start packet, in a first time length after a third time, and according to whether the forwarding device receives a first end packet, the status identified by the status identifier to a success state or a failure state; and
the third time is a time at which the first start packet is received, the first start packet is a first packet that is of the service flow and sent by the network object, and the first end packet is a last packet that is of the service flow and sent by the network object.

5. The method according to claim 1, wherein the method further comprises, before sending, by the forwarding device, the detection information to the first device:
obtaining, by the forwarding device from the service flow, KPIs of N service flows that are in a current cycle and that belong to a target network object, wherein the target network object is a network object to which the service flow belongs, and N is an integer greater than 0; and
obtaining, by the forwarding device, a feature set based on the KPIs of the N service flows.

6. The method according to claim 5, wherein:
the feature set comprises at least one statistical feature; and
obtaining, by the forwarding device, the feature set based on the KPIs of the N service flows comprises:
obtaining, by the forwarding device, M KPI sets, wherein any KPI set of the M KPI sets comprises one KPI of each of the N service flows, and types of the KPIs of the any KPI set are the same; and
performing, by the forwarding device in at least one first calculation manner, calculation on the KPIs of the any KPI set, to obtain at least one statistical feature corresponding to the any KPI set, wherein the at least one first calculation manner comprises one or more of:
collecting statistics on the KPIs of the any KPI set; or
calculating an average value, a variance, dispersion, skewness, or kurtosis of the KPIs of the any KPI set.

7. The method according to claim 6, wherein:
the feature set further comprises at least one time domain feature; and
the method further comprises, performing, by the forwarding device after performing the calculation on the KPIs of the any KPI set, calculation on statistical features of the statistical feature set in at least one second calculation manner, to obtain at least one time domain feature; and
the statistical feature set comprises K statistical features, the K statistical features are statistical features of a same type and obtained through calculation in K cycles, the K cycles comprise the current cycle and K−1 cycles before the current cycle, and the at least one second calculation manner comprises one or more of:
calculating a period-on-period value or a differential value between two adjacent statistical features in the statistical feature set; or
performing feature fitting on the statistical features in the statistical feature set.

8. The method according to claim 6, wherein:
the any KPI set comprises status identifiers of the N service flows, the status identifier of any one of the N service flows identifies a status of the any service flow, the statistical feature of the any KPI set comprises a quantity of status identifiers that identify a success state and a quantity of status identifiers that identify a failure state, and the feature set further comprises a proportion of service flows in the success state or a proportion of service flows in the failure state; and
the method further comprises, after performing the calculation on the KPIs of the any KPI set:
calculating the proportion of the service flows in the success state based on the quantity of status identifiers that identify the success state and a quantity of KPIs of the any KPI set; or
calculating the proportion of the service flows in the failure state based on the quantity of status identifiers that identify the failure state and the quantity of KPIs of the any KPI set.

9. A method, comprising:
receiving, by a first device, service information of a service flow and sent by a forwarding device, wherein the service information of the service flow comprises identification information of a network object to which the service flow belongs and M key performance indicators (KPIs) of the service flow, M is an integer greater than 0, and the network object comprises a device,
wherein the M KPIs comprises, based on a target service packet from the service flow further based on configuration policy information:
a network delay between the forwarding device and the network object to which the service flow belongs,
a first data volume that is of the service flow and sent by the network object,
a second data volume that is of the service flow and received by the network object, or
a status identifier that identifies a status of the service flow; and
detecting, by the first device based on the service information of the service flow using a fault detection model, whether the network object is in a faulty state, or obtaining, based on the service information of the service flow, at least one feature set for detecting the network object.

10. The method according to claim 9, wherein detecting, by the first device based on the service information of the service flow using the fault detection model, whether the network object is in the faulty state comprises:
obtaining, by the first device from the service flow, KPIs of N service flows that are in a current cycle and that belong to a target network object, wherein the target network object is a network object to which the service flow belongs, and N is an integer greater than 0;
obtaining, by the first device, a feature set based on the KPIs of the N service flows; and
detecting, by the first device based on the feature set using the fault detection model, whether the target network object is in the faulty state.

11. The method according to claim 10, wherein:
the feature set comprises at least one statistical feature; and
obtaining, by the first device, the feature set based on the KPIs of the N service flows comprises obtaining, by the first device, M KPI sets, wherein any KPI set comprises one KPI of each of the N service flows, and types of the KPIs of the any KPI set are the same; and
performing, by the first device, calculation on the KPIs of the any KPI set in at least one first calculation manner, to obtain at least one statistical feature corresponding to the any KPI set, wherein the at least one first calculation manner comprises one or more of:
collecting statistics about the KPIs in the any KPI set; or
calculating an average value, a variance, dispersion, skewness, or kurtosis of the KPIs of the any KPI set.

12. The method according to claim 11, wherein:
the feature set further comprises at least one time domain feature; and
the method further comprises, after performing the calculation on the KPIs of the any KPI set: performing calculation on statistical features of the statistical feature set in at least one second calculation manner, to obtain at least one time domain feature, wherein the statistical feature set comprises K statistical features, the K statistical features are statistical features of a same type and obtained through calculation in K cycles, the K cycles comprise the current cycle and K-1 cycles before the current cycle, and the at least one second calculation manner comprises one or more of:
calculating a period-on-period value or a differential value between two adjacent statistical features in the statistical feature set; or
performing feature fitting on the statistical features in the statistical feature set.

13. The method according to claim 9, further comprising, in response to detecting that a target network object is in the faulty state:
obtaining, by the first device, a KPI of the target network object or a service flow of the target network object; and
performing fault locating based on the KPI of the target network object or the service flow of the target network object.

14. An apparatus, comprising:
at least one processor; and
at least one non-transitory computer-readable storage medium storing a program executable by the at least one processor, the program comprising instructions to:
receive a service flow;
obtain service information of the service flow, wherein the service information of the service flow comprises identification information of a network object to which the service flow belongs and M key performance indicators (KPIs) of the service flow, M is an integer greater than 0, and the network object comprises a device,
wherein the M KPIs comprises, based on a target service packet from the service flow further based on configuration policy information:
a network delay between the apparatus and the network object to which the service flow belongs,
a first data volume that is of the service flow and sent by the network object,
a second data volume that is of the service flow and received by the network object, or
a status identifier that identifies a status of the service flow; and
send detection information to a first device to detect whether the network object is in a faulty state, wherein the detection information comprises the service information of the service flow or a feature set obtained based on the service information of the service flow.

15. The apparatus according to claim 14, wherein:
a protocol type of the service flow is Transmission Control Protocol (TCP); and
the program further includes instructions to:
obtain the target service packet from the service flow based on the configuration policy information, wherein the configuration policy information comprises a preset packet type; and
obtain the M KPIs of the service flow based on the target service packet.

16. The apparatus according to claim 15, wherein:
the program further includes instructions to:
obtain, in response to the target service packet comprising a first target service packet and a second target service packet, the network delay between the apparatus and the network object based on a first time at which the first target service packet is received and a second time at which the second target service packet is received, wherein the first target service packet is a packet sent to the network object, and the second target service packet is a packet that is sent by the network object and that corresponds to the first target service packet; or
obtain, in response to the target service packet comprising a first start packet and a first end packet, and based on a sequence number of the first start packet and a sequence number of the first end packet, the first data volume that is of the service flow and sent by the network object, wherein the first start packet is a first packet of the service flow and sent by the network object, and the first end packet is a last packet of the service flow and sent by the network object; or
obtain, in response to the target service packet comprising a second start packet and a second end packet, and based on a sequence number of the second start packet and a sequence number of the second end packet, the second data volume that is of the service flow and received by the network object, wherein the second start packet is a first packet of the service flow and received by the network object, and the second end packet is a last packet of the service flow and received by the network object.

17. The apparatus according to claim 15, wherein:
wherein the program further includes instructions to, when the target service packet comprises a first start packet, in a first time length after a third time:
set, if a first end packet is received, the status identified by the status identifier to a success state; or
set, if the first end packet is not received, the status identified by the state identifier to a failure state; and
the third time is a time at which the first start packet is received, the first start packet is a first packet that is of the service flow and sent by the network object, and the first end packet is a last packet that is of the service flow and sent by the network object.

18. The apparatus according to claim 14, wherein the program further includes instructions to:
- obtain, from the service flow, KPIs of N service flows that are in a current cycle and that belong to a target network object, wherein the target network object is a network object to which the service flow belongs, and N is an integer greater than 0; and
- obtain a feature set based on the KPIs of the N service flows.

19. The apparatus according to claim 18, wherein:
the feature set comprises at least one statistical feature; and
the program further includes instructions to:
- obtain M KPI sets, wherein any KPI set of the M KPI sets comprises one KPI of each of the N service flows, and types of the KPIs of the any KPI set are the same; and
- perform calculation on the KPIs of the any KPI set in at least one first calculation manner, to obtain at least one statistical feature corresponding to the any KPI set, wherein the at least one first calculation manner comprises one or more of:
  - collecting statistics about the KPIs of the any KPI set; or
  - calculating an average value, a variance, dispersion, skewness, or kurtosis of the KPIs of the any KPI set.

20. The apparatus according to claim 19, wherein:
the feature set further comprises at least one time domain feature; and
the program further includes instructions to perform calculation on statistical features of the statistical feature set in at least one second calculation manner, to obtain at least one time domain feature;
the statistical feature set comprises K statistical features, the K statistical features are statistical features of a same type and obtained through calculation in K cycles, the K cycles comprise the current cycle and K−1 cycles before the current cycle, and the at least one second calculation manner comprises one or more of:
- calculating a period-on-period value or a differential value between two adjacent statistical features in the statistical feature set; and
- performing feature fitting on the statistical features in the statistical feature set.

* * * * *